(12) United States Patent
Nakamura et al.

(10) Patent No.: US 7,164,164 B2
(45) Date of Patent: Jan. 16, 2007

(54) DISPLAY DEVICE AND PHOTOELECTRIC CONVERSION DEVICE

(75) Inventors: Takashi Nakamura, Kumagaya (JP); Norio Tada, Kumagaya (JP); Masahiro Tada, Fukaya (JP)

(73) Assignee: Toshiba Matsushita Display Technology Co., Ltd., Tokyo-To (JP)

( * ) Notice: Subject to any disclaimer, the term of this patent is extended or adjusted under 35 U.S.C. 154(b) by 72 days.

(21) Appl. No.: 10/924,940

(22) Filed: Aug. 25, 2004

(65) Prior Publication Data
US 2005/0045881 A1 Mar. 3, 2005

(30) Foreign Application Priority Data

| Aug. 25, 2003 | (JP) | ............................. 2003-300467 |
| Aug. 25, 2003 | (JP) | ............................. 2003-300476 |
| Dec. 18, 2003 | (JP) | ............................. 2003-421026 |
| May 20, 2004 | (JP) | ............................. 2004-150826 |

(51) Int. Cl.
*H01L 31/62* (2006.01)

(52) U.S. Cl. ...................... 257/292; 257/431; 257/461; 257/463; 257/E27.133; 257/E25.032; 257/E31.115

(58) Field of Classification Search ................. 257/88, 257/443, 292, 233, 431, 461, 463, E27.133, 257/E25.032, E31.115; 250/208.1
See application file for complete search history.

(56) References Cited

U.S. PATENT DOCUMENTS 5,880,494 A 3/1999 Watanabe

| 2002/0044208 A1 | 4/2002 | Yamazaki et al. |
| 2002/0079512 A1 | 6/2002 | Yamazaki et al. |
| 2002/0125410 A1* | 9/2002 | Zhang et al. |
| 2003/0201450 A1* | 10/2003 | Yamazaki et al. |
| 2004/0043676 A1 | 3/2004 | Tada et al. |

FOREIGN PATENT DOCUMENTS

| JP | 09-199752 | 7/1997 |
| JP | 2959682 | 7/1999 |
| KR | 1996-0002874 | 1/1996 |

* cited by examiner

*Primary Examiner*—Andy Huynh
(74) *Attorney, Agent, or Firm*—Oblon, Spivak, McClelland, Maier & Neustadt, P.C.

(57) ABSTRACT

A display device has display elements provided inside of pixels, each being formed in vicinity of intersections of signal lines and scanning lines aligned in matrix form; and photoelectric conversion elements, wherein each of the photoelectric conversion elements includes first, second and third semiconductor regions disposed adjacently in sequence in parallel to a surface of a substrate; a first electrode connected to the first semiconductor region; and a second electrode connected to the third semiconductor region, the first semiconductor region being formed by injecting a first conductive impurity in first dose amount; the third semiconductor region being formed by injecting a second conductive impurity in second dose amount; and the second semiconductor region being formed by injecting the first conductive impurity in third dose amount less than the first dose amount.

1 Claim, 31 Drawing Sheets

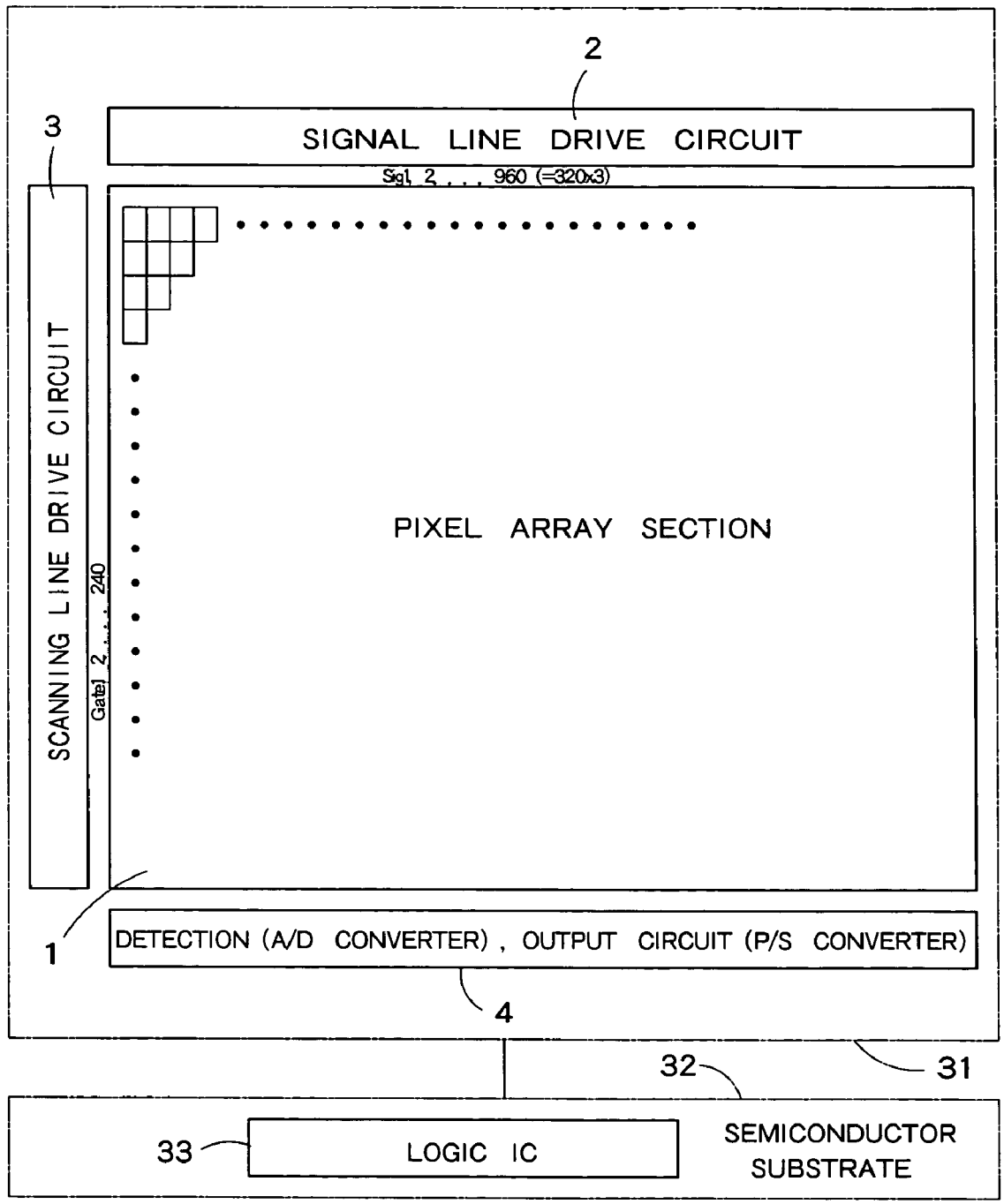
F I G. 1

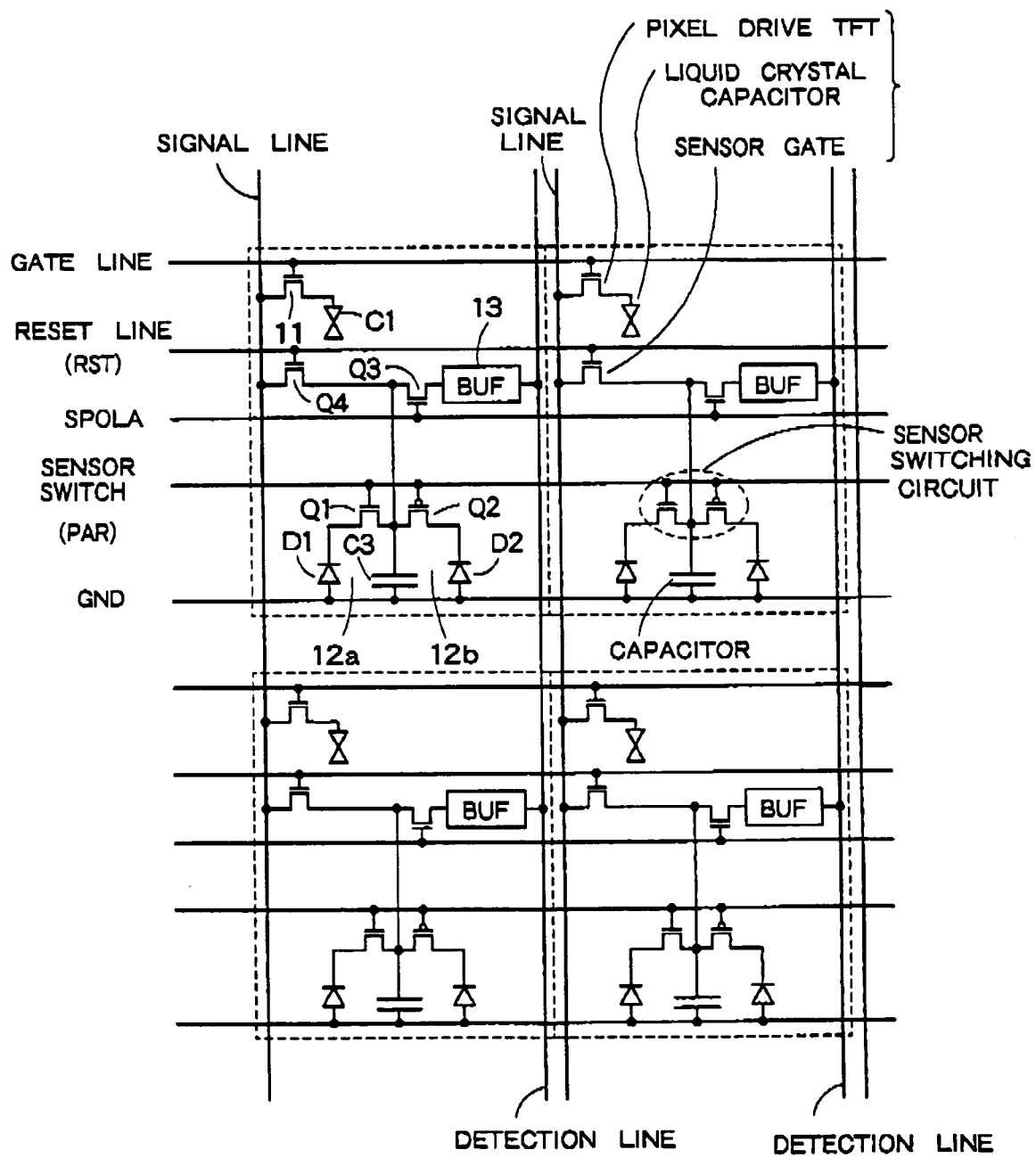
F I G. 3

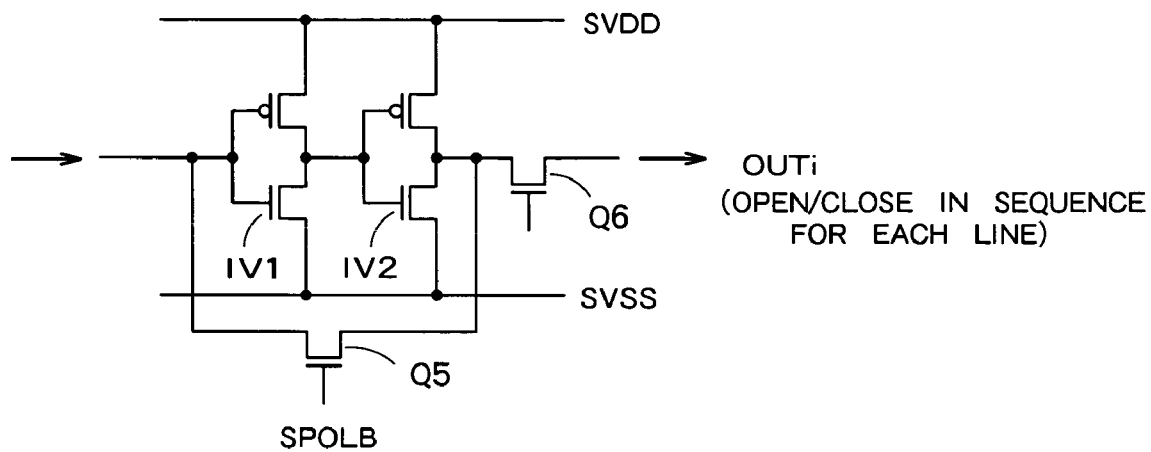
F I G. 4
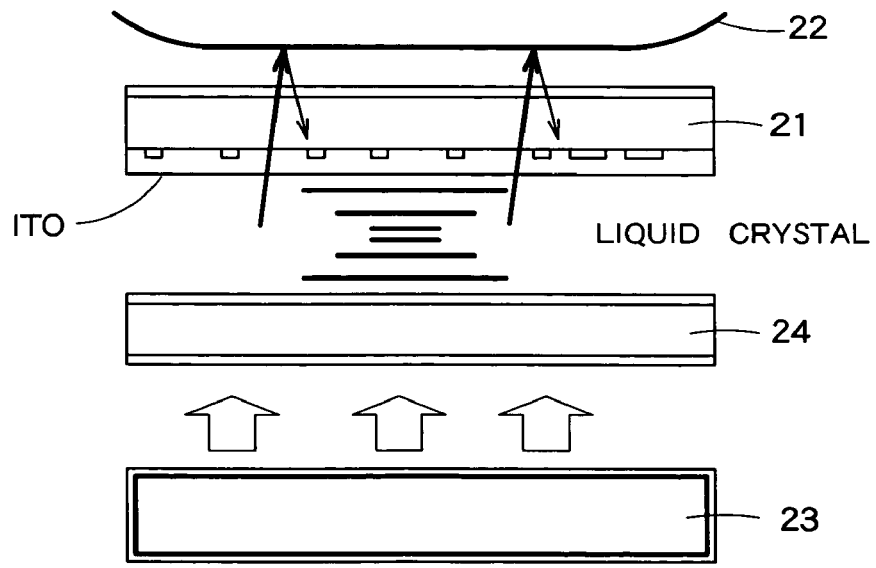
F I G. 5

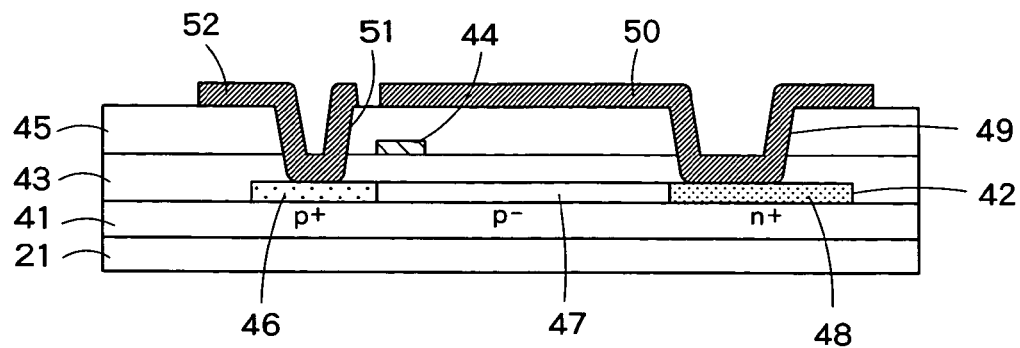
F I G. 6
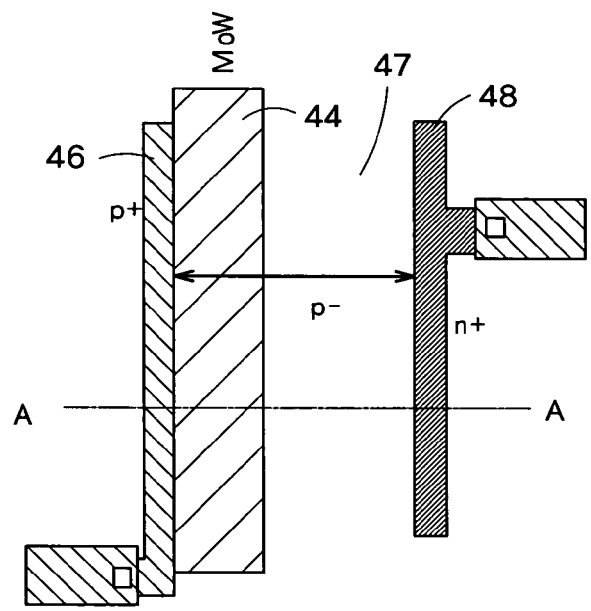
F I G. 7
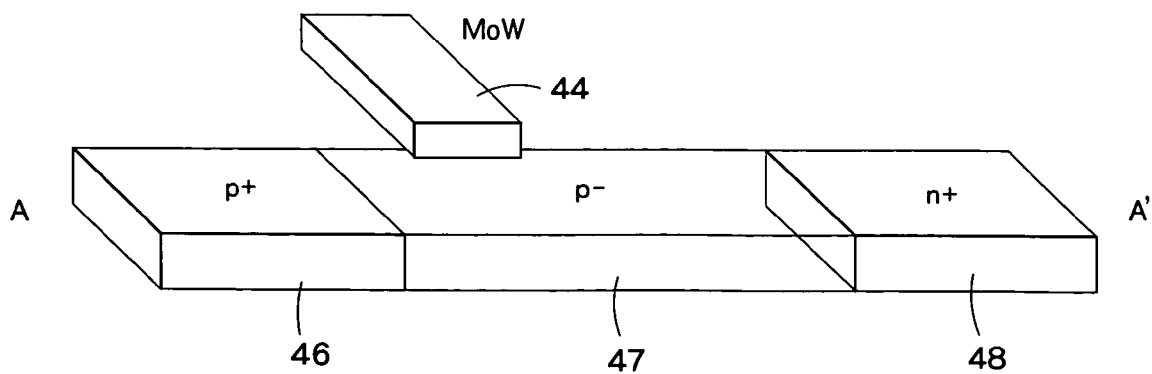
F I G. 8

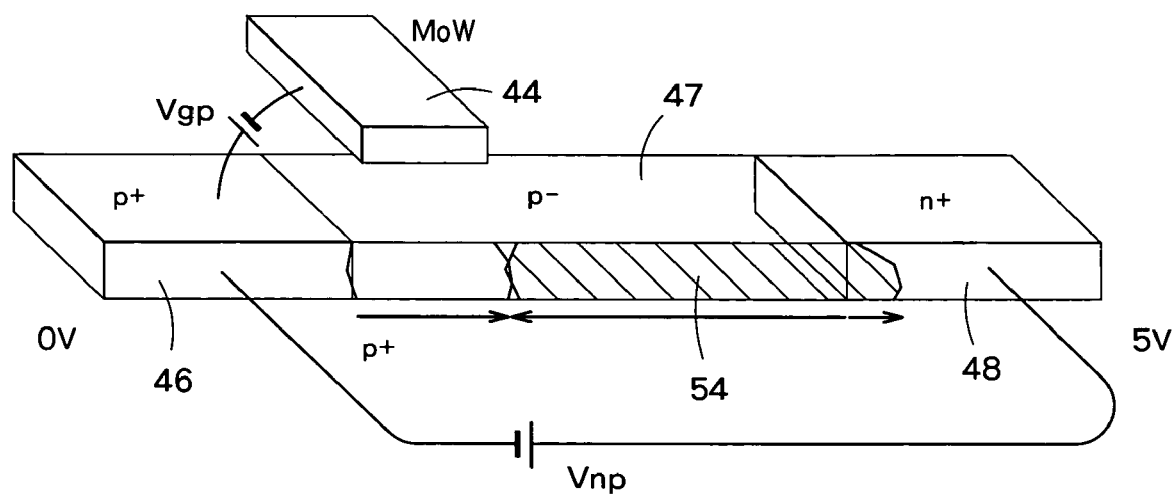
F I G. 9
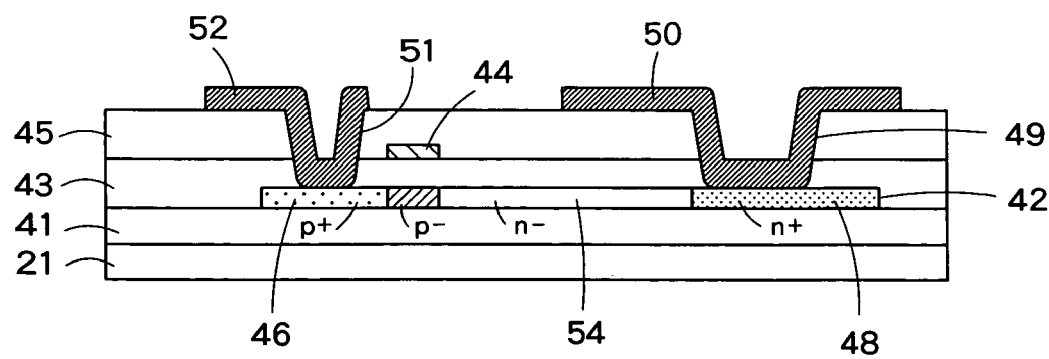
F I G. 10

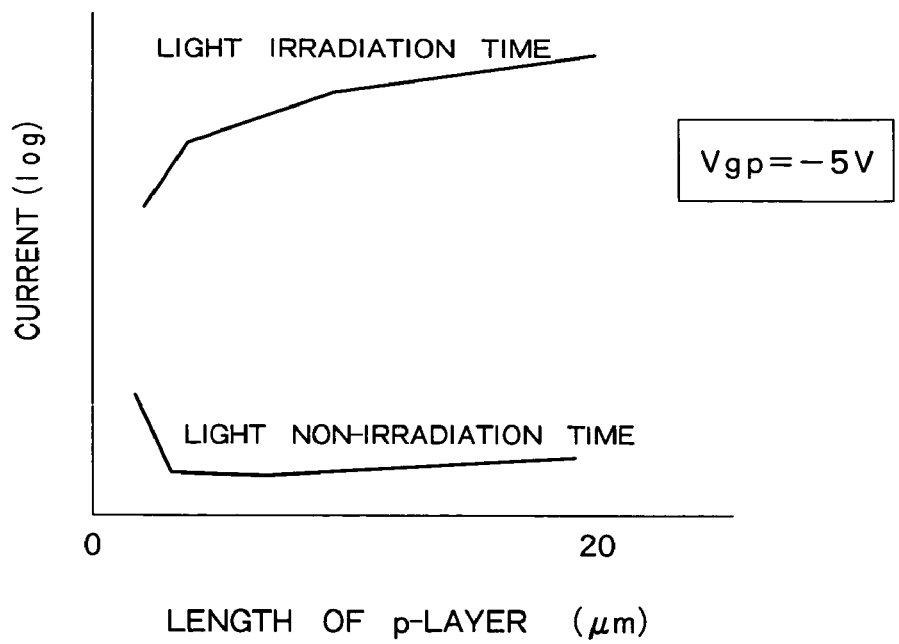
F I G. 11
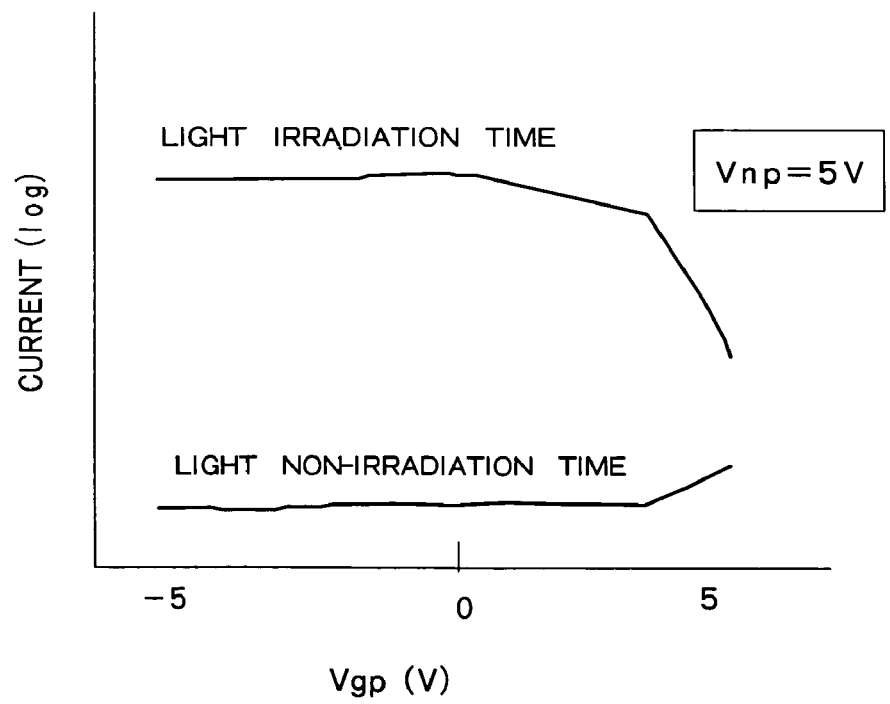
F I G. 12

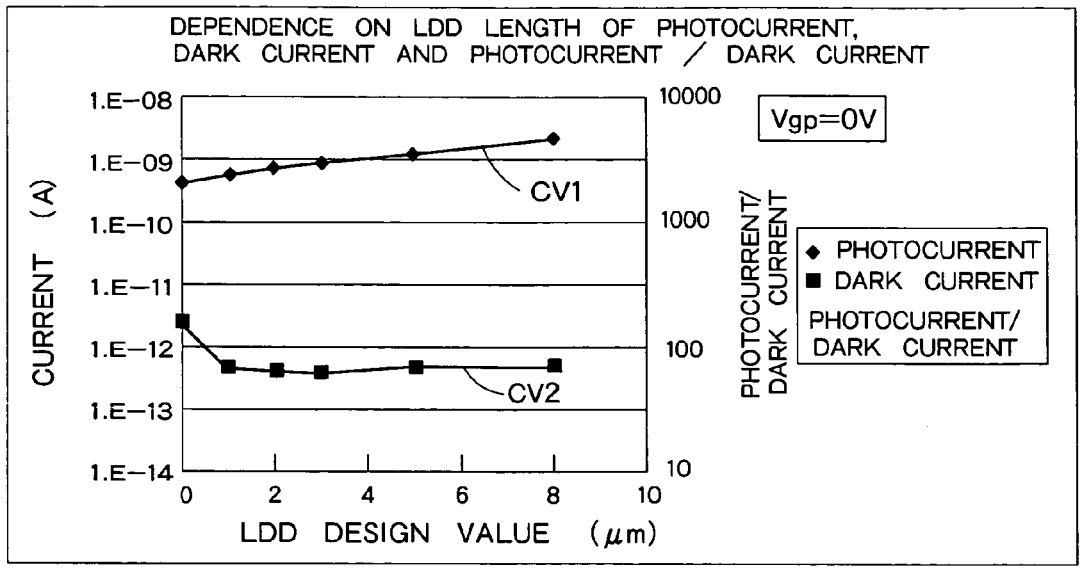
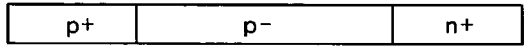
F I G. 13
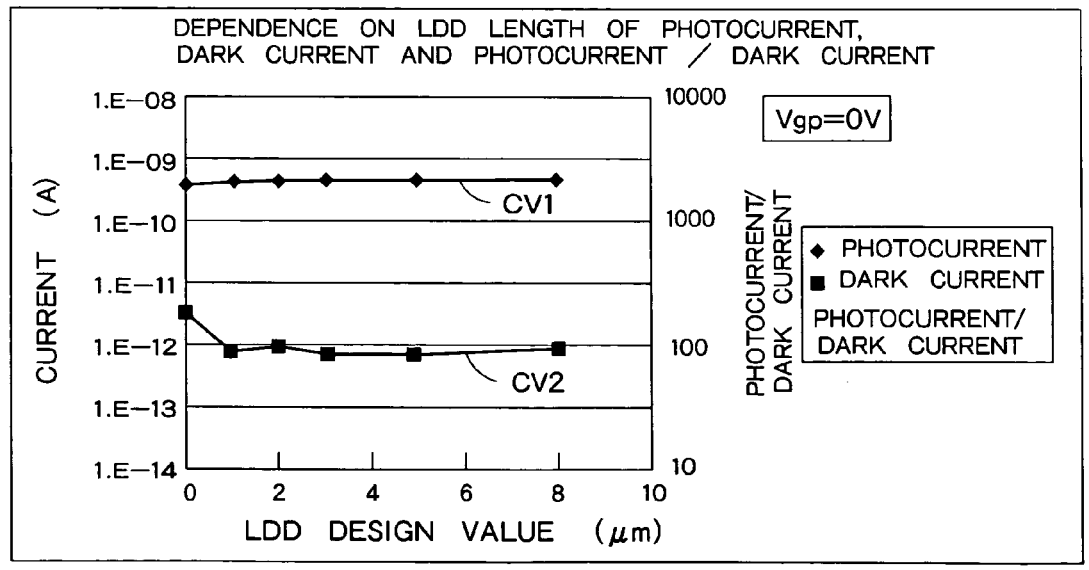
F I G. 14

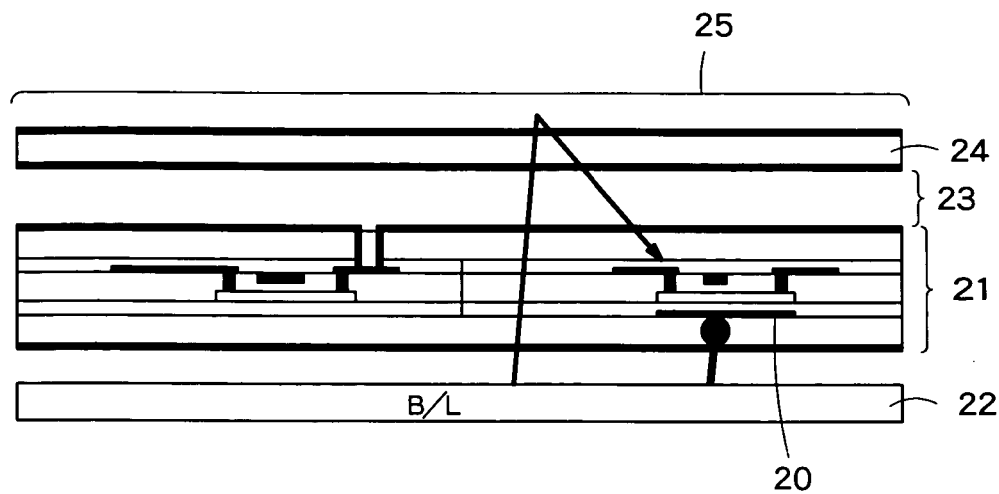
F I G. 19
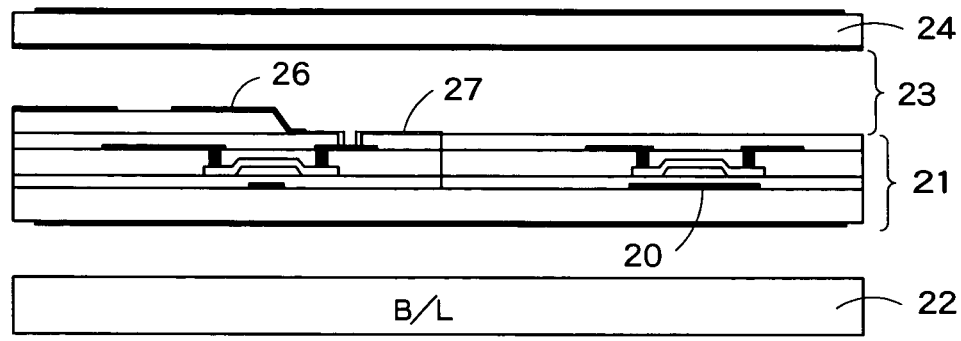
F I G. 20
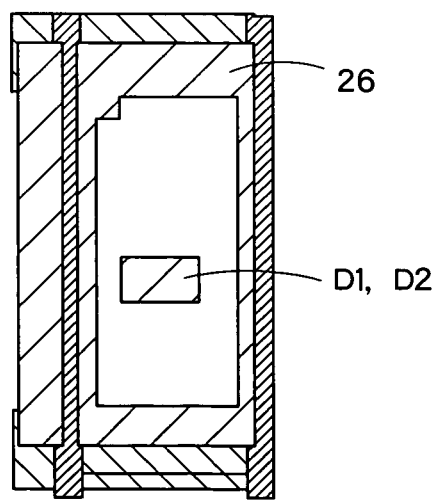
F I G. 21

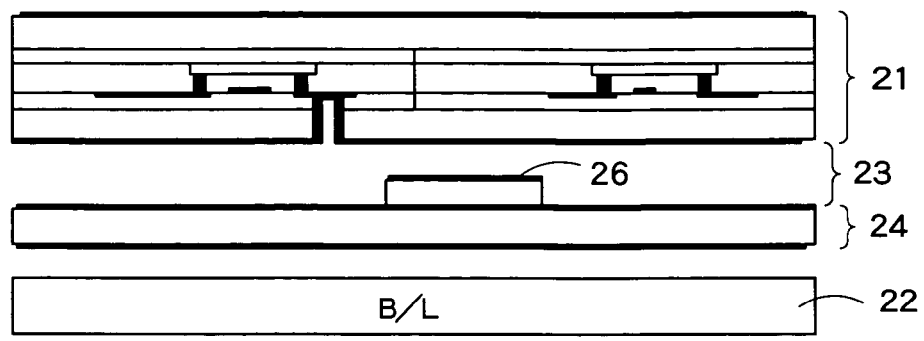
F I G. 22
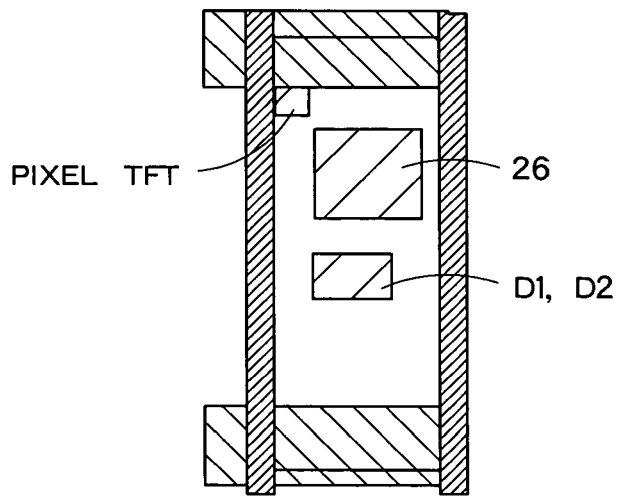
F I G. 23
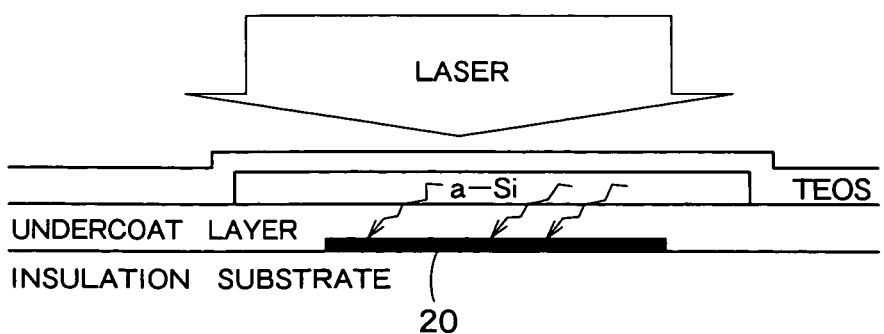
F I G. 24

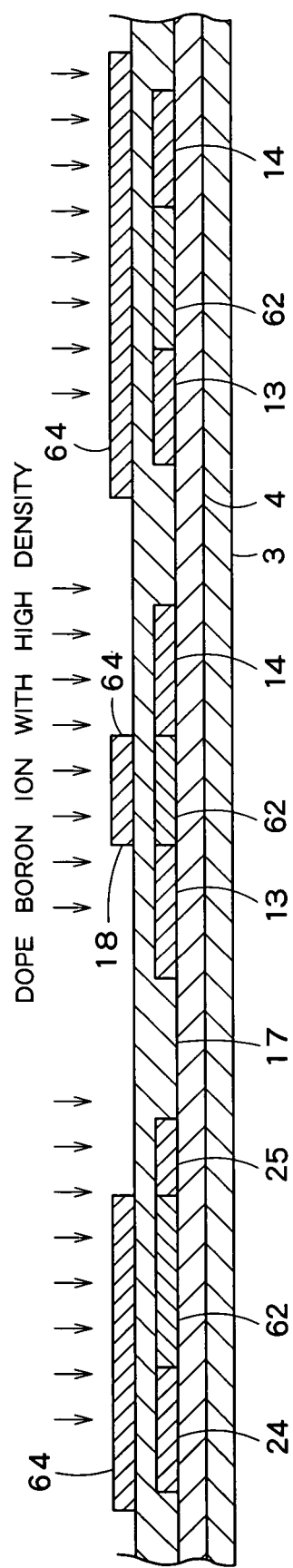
F I G. 34

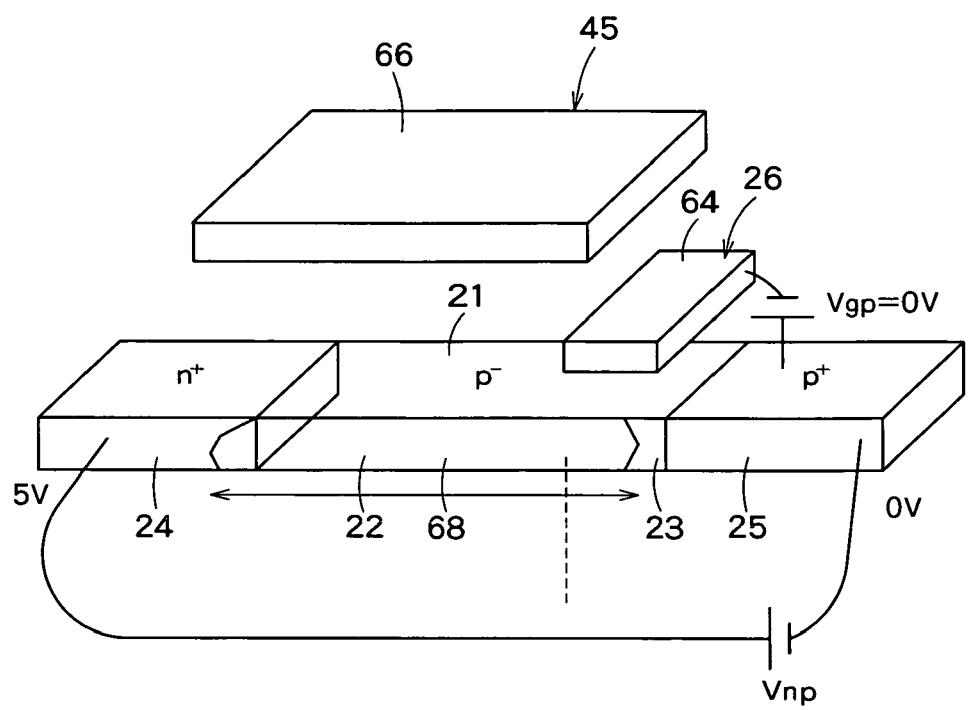
F I G. 38
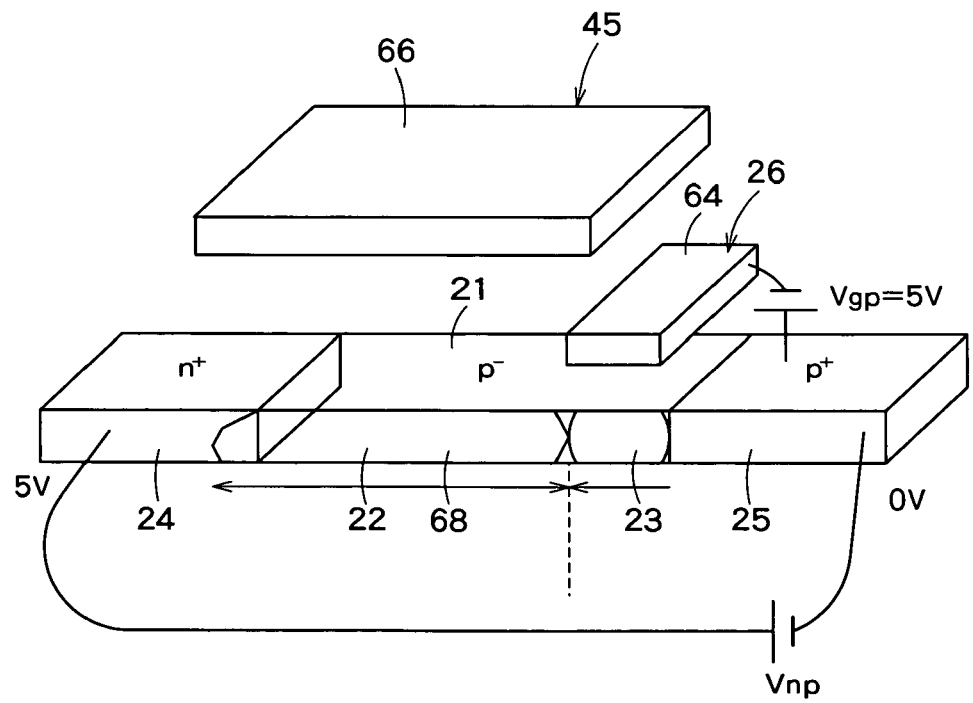
F I G. 39

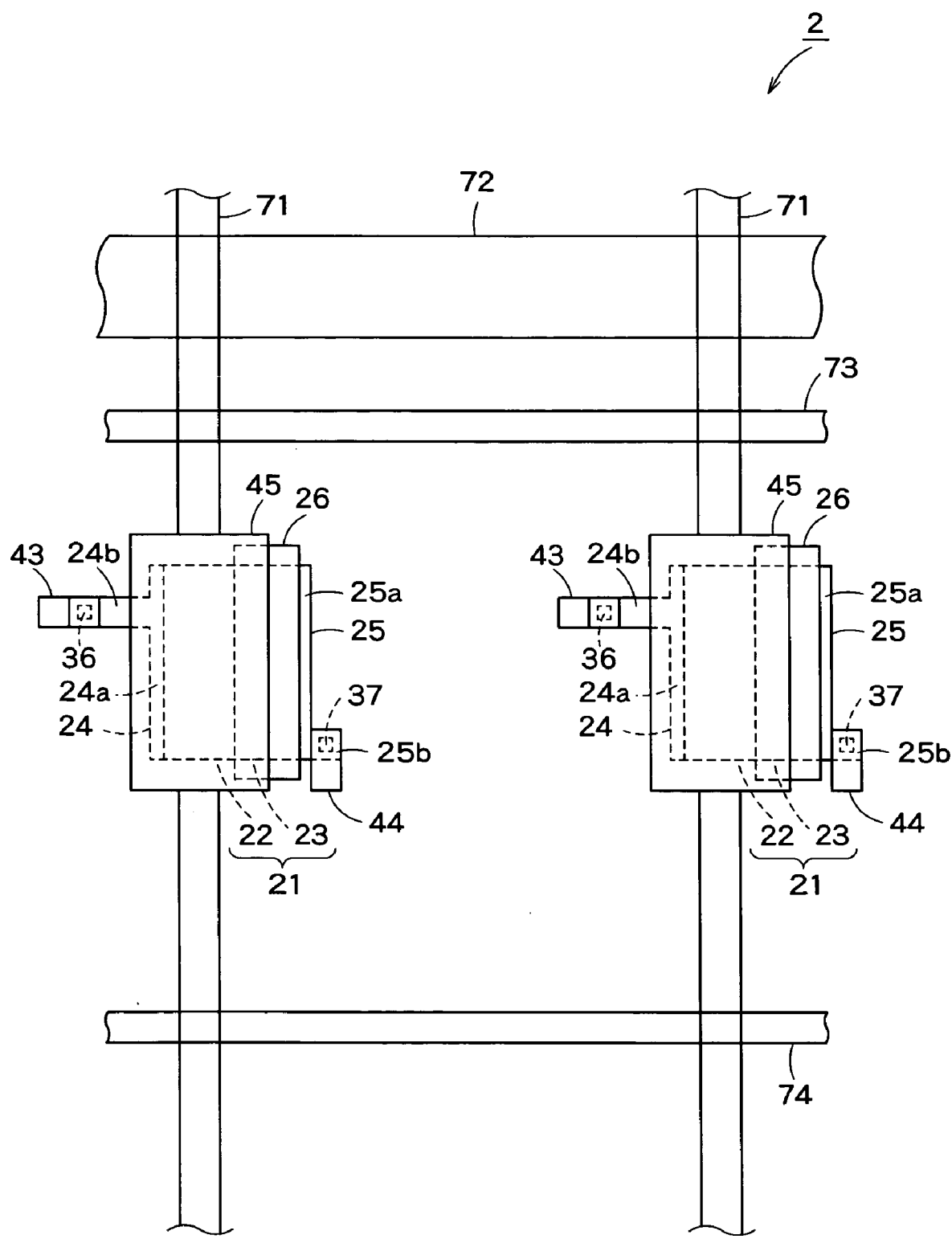
F I G. 40

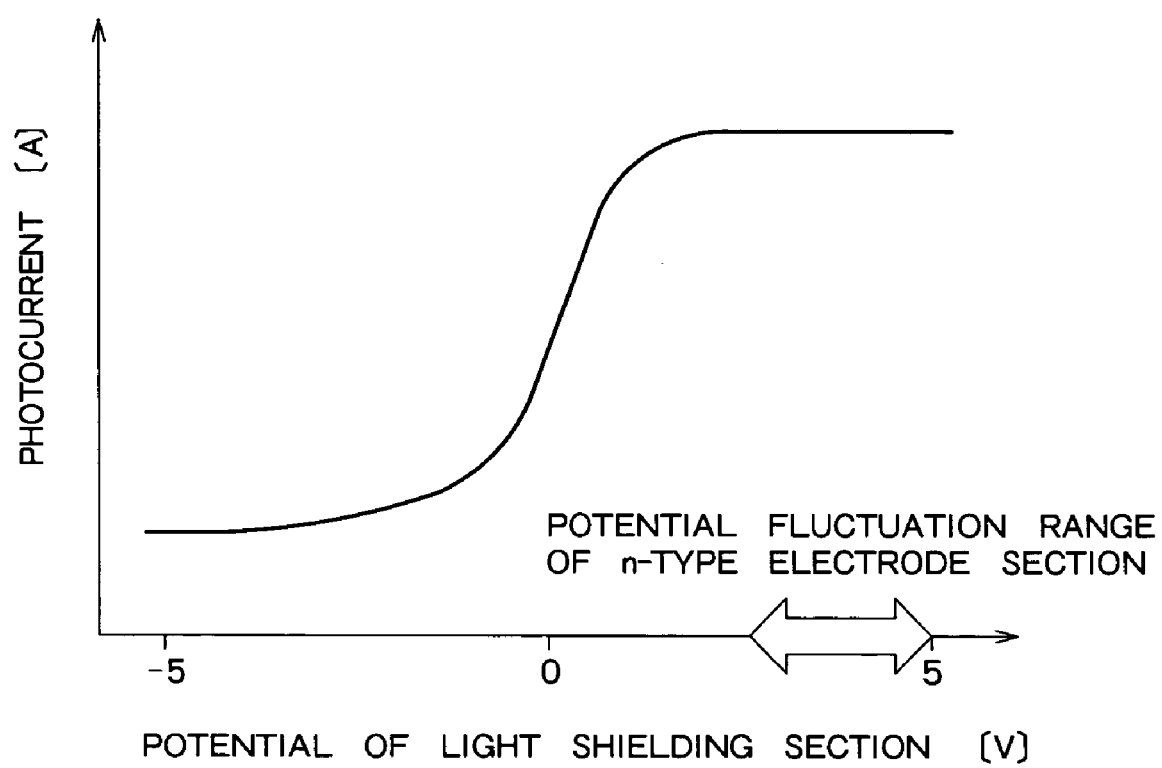
F I G. 42

DISPLAY DEVICE AND PHOTOELECTRIC CONVERSION DEVICE

CROSS REFERENCE TO RELATED APPLICATIONS

This application claims benefit of priority under 35USC§119 to Japanese Patent Applications No. 2003-300476 filed on Aug. 25, 2003, No. 2003-300467 filed on Aug. 25, 2003, No. 2003-421026 filed on Dec. 18, 2003 and No. 2004-150826 filed on May 20, 2004, the entire contents of which are incorporated by reference herein.

BACKGROUND OF THE INVENTION

1. Field of the Invention

The present invention relates to a display device and a photoelectric conversion device with an image capturing function.

2. Related Art

A liquid crystal display device has an array substrate on which signal lines, scanning lines, and pixel thin film transistors (pixel TFTs) are arranged; and a driving circuit which drives the signal lines and scanning lines. A process technology by which a part of the driving circuit is formed on the array substrate has been put to practical use along with the recent development of integrated circuit technologies. Thereby, the whole size of the liquid crystal display device can be made thinner and smaller, and it has been widely used as display devices for various types of portable equipment such as a cellular telephone and a notebook computer.

Incidentally, display devices which have an image capturing function composed of contact type area sensors (photoelectric conversion devices) for image capturing on the array substrate have been proposed (refer to, for example, the Japanese Patent Application Publication No. 2001-292276, and the Japanese Patent Application Publication No. 2001-339640).

In a conventional display device with such an image capturing function, the amount of electric charge of the capacitors connected to the photoelectric devices is changed according to the amount of light received by the photoelectric conversion device, and image capturing is conducted by detecting a voltage at both ends of the capacitor.

As a technology which pixel TFTs and a driving are formed on the same glass substrate in a polysilicon process has been advanced in recent years, the photoelectric conversion device can be easily formed in each pixel, using the polysilicon process.

However, it is difficult to obtain an enough photoelectric current with the photoelectric conversion device using polysilicon. Though a technology by which a photoelectric conversion device is formed, using amorphous silicon, has been well known to date, the technology has a disadvantage that the manufacturing cost is increased, because a different amorphous silicon process from those of a pixel TFT and a driving circuit formed in the polysilicon process is required to be prepared.

SUMMARY OF THE INVENTION

In order to solve the above-described problem, an object of the present invention is to provide a display device and a photoelectric conversion device which can obtain sufficient photoelectric current without further production cost.

A display device according to one embodiment of the present invention, comprising:
  display elements provided inside of pixels, each being formed in vicinity of intersections of signal lines and scanning lines aligned in matrix form; and
  photoelectric conversion elements,
  wherein each of said photoelectric conversion elements includes:
  first, second and third semiconductor regions disposed adjacently in sequence in parallel to a surface of a substrate;
  a first electrode connected to said first semiconductor region; and
  a second electrode connected to said third semiconductor region,
  said first semiconductor region being formed by injecting a first conductive impurity in first dose amount;
  said third semiconductor region being formed by injecting a second conductive impurity in second dose amount; and
  said second semiconductor region being formed by injecting said first conductive impurity in third dose amount less than said first dose amount.

Furthermore, a display device according to one embodiment of the present invention, comprising:
  display elements provided inside of pixels, each being formed in vicinity of intersections of signal lines and scanning lines aligned in matrix form; and
  photoelectric conversion elements,
  wherein each of said photoelectric conversion elements includes:
  first, second and third semiconductor regions disposed adjacently in sequence in parallel to a surface of a substrate;
  a first electrode connected to said first semiconductor region; and
  a second electrode connected to said third semiconductor region,
  said first semiconductor region being formed by injecting a first conductive impurity in first dose amount;
  said third semiconductor region being formed by injecting a second conductive impurity in second dose amount; and
  said second semiconductor region being formed by injecting said second conductive impurity in third dose amount less than said second dose amount.

Furthermore, a photoelectric conversion device according to one embodiment of the present invention, comprising:
  first, second and third semiconductor regions which are formed on an insulation substrate and are disposed adjacently in sequence in direction parallel to a surface of said substrate;
  a first insulation layer formed on upper face of said first, second and third semiconductor regions;
  a gate electrode formed on a portion of upper face of said first insulation layer;
  a second insulation layer formed on upper face of said first insulation layer and said gate electrode; and
  an electrode layer connected to said first and said third semiconductor regions via contacts formed on portions of said first and second insulation layers,
  said first semiconductor region being formed by injecting a first conductive impurity in first dose amount;
  said third semiconductor region being formed by injecting a second conductive impurity in second dose amount; and
  said second semiconductor region being formed by injecting said first conductive impurity in third dose amount less than said first dose amount.

Furthermore, a photoelectric conversion device according to one embodiment of the present invention, comprising:

first, second and third semiconductor regions disposed adjacently in sequence in direction parallel to a surface of an insulation substrate;

a first insulation layer formed on upper face of said first, second and third semiconductor regions;

a gate electrode formed on a portion of upper face of said first insulation layer;

a second insulation layer formed on upper face of said first insulation layer and said gate electrode; and an electrode layer connected said first and third semiconductor layers via contacts formed on portions of said first and second insulation layers, said first semiconductor regions being formed by injecting a first conductive impurity in first dose amount;

said third semiconductor regions being formed by injecting a second conductive impurity in second dose amount; and said second semiconductor region being formed by injecting said second conductive impurity in third dose amount less than said second dose amount.

Furthermore, a display device, comprising:

display elements provided inside of pixels formed in vicinity of intersections of signal lines and scanning lines disposed in matrix form;

photoelectric conversion elements provided at least one corresponding to said display elements, each conducting image pickup at a predetermined range of a subject;

an array substrate on which said display elements and said photoelectric conversion elements are formed;

an opposite substrate disposed oppositely to said array substrate by sandwiching a liquid crystal layer; and a backlight which is disposed oppositely to said liquid crystal layer by sandwiching said array substrate and radiates light in said liquid crystal layer, wherein said array substrate has a light shielding layer which shields light so that direct light from said backlight is not radiated in said photoelectric conversion elements.

Furthermore, a photoelectric conversion device according to one embodiment of the present invention, comprising:

first and second light receiving sections which are electrically connected to each other and arranged adjacently;

a first conductive type of first electrode which is electrically connected to said first light receiving section and is disposed at opposite side of said second light receiving section by sandwiching said first light receiving section;

a second conductive type of second electrode which is electrically connected to said second light receiving section and is disposed at opposite side of said first light receiving section by sandwiching said second light receiving section;

a gate electrode disposed oppositely to at least portion of said second light receiving section by sandwiching a first insulation layer; and light shielding layer which is disposed oppositely to at least portion of said gate electrode by sandwiching a second insulation layer and covers the whole first light receiving section.

Furthermore, a display device according to one embodiment of the present invention, comprising:

a transparent substrate;

photoelectric conversion elements formed on said transparent substrate; and a light shielding section which shields light irradiated from opposite side of said transparent substrate by sandwiching said photoelectric element, wherein each of said photoelectric conversion element includes:

first and second light receiving sections which are electrically connected to each other and disposed adjacently to each other;

a first conductive type of first electrode which is electrically connected to said first light receiving section and disposed at opposite side of said second light receiving section by sandwiching said first light receiving section;

a second conductive type of second electrode which is electrically connected to said second light receiving section and disposed at opposite side of said first light receiving section; and a gate electrode disposed oppositely to at least a portion of said second light receiving section by sandwiching a first insulation layer.

BRIEF DESCRIPTION OF THE DRAWINGS

FIG. 1 is a schematic block diagram according to a first embodiment of the present invention.

FIG. 3 is a circuit diagram showing details of the part shown in FIG. 2.

FIG. 4 is a circuit diagram showing internal configuration of the SRAM.

FIG. 5 is a diagram explaining image capturing.

FIG. 6 is a cross section view showing structure of photodiodes showing in FIG. 3.

FIG. 7 is a top view of photodiodes.

FIG. 8 is a perspective view of photodiodes.

FIG. 9 is a diagram showing a depletion layer formed in photodiodes.

FIG. 10 is a cross section view having an n-region instead of p-region.

FIG. 11 is a diagram showing electric properties of photodiodes.

FIG. 12 is a diagram showing electric properties of photodiodes.

FIG. 13 is a diagram showing electric properties of photodiodes having a p$^+$region 46, a p$^-$region 47 and n$^+$region 48 shown in FIG. 6.

FIG. 14 is a diagram showing electric properties of photodiodes having a p$^+$region 46, a p$^-$region 47 and n$^+$region 48 shown for comparison.

FIG. 19 is a cross section view showing cross sectional structure of the display device.

FIG. 20 is a cross section view showing cross sectional structure of the display device according to the present embodiment.

FIG. 21 is a plan view of the display device according to the present embodiment.

FIG. 22 is a cross section view of a case in which the relation between the position of the array substrate 21 and that of the opposed substrate 24 is obtained by reversing that of FIG. 20.

FIG. 23 is a plan view of a case in which the relation between the position of the array substrate 21 and that of the opposed substrate 24 is obtained by reversing that of FIG. 20.

FIG. 24 is a diagram having a light shielding layer made of a metal layer below photodiodes.

FIG. 34 is a cross section view following to FIG. 33.

FIG. 38 is a perspective view showing operation in the case where a voltage between the p-type electrode and the gate electrode of the photoelectric conversion element is 0V.

FIG. 39 is a perspective view showing operation in the case where a voltage between the p-type electrode and the gate electrode of the photoelectric conversion element is −5V.

FIG. 40 is a layout diagram showing a first example of a specified forming location of the light shielding layer.

FIG. 42 is a diagram showing a relationship between a potential and a photo current.

DETAILED DESCRIPTION OF THE INVENTION

Figure 2:
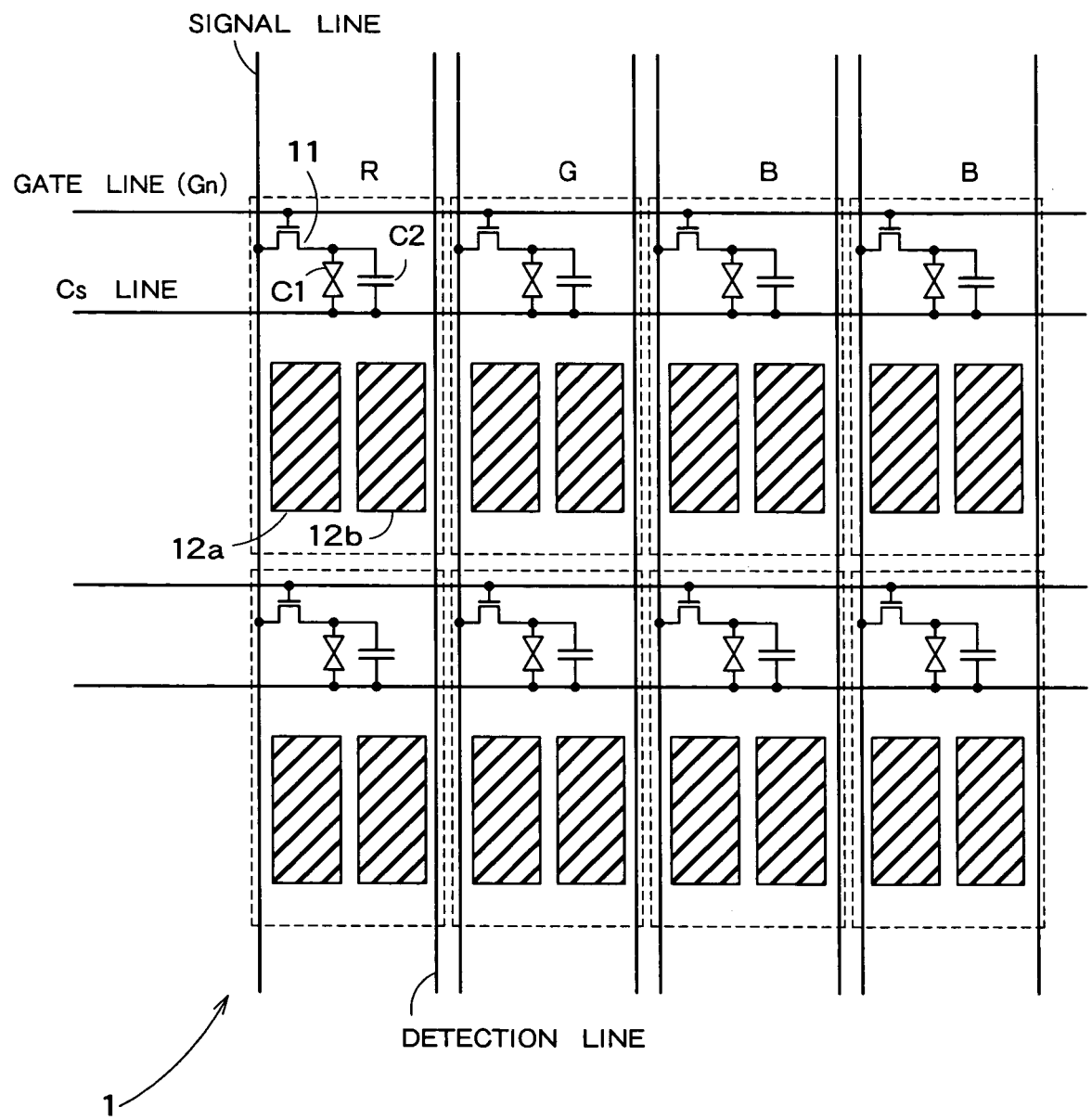
FIG. 2 is a block diagram showing a part of the pixel array section 1.

Hereinafter, a display device and a photoelectric conversion device according to the present invention will be specifically explained, referring to drawings.

FIG. 1 is a schematic block diagram according to a first embodiment of the present invention. The display device shown in FIG. 1 has an image capturing function, and comprises a glass substrate 31 and a semiconductor substrate 32. A pixel array section 1 in which signal lines and scanning lines are arranged, a signal line drive circuit 2 which drives the signal lines, a scanning line drive circuit 3 which drives the scanning lines, and a detection output circuit 4 which captures images for output are provided on the glass substrate 31. These circuits are formed with, for example, polysilicon TFTs. The signal line drive circuit 2 includes a not-shown digital-analog conversion circuit which converts digital pixel data into an analog voltage suitable for driving the display element. The digital-analog conversion may have a well-known configuration. A logic IC 33 for display control and image capturing one is implemented on the semiconductor substrate 32. The glass substrate 31 and the semiconductor substrate 32 perform transmission and reception of various signals through, for example, a flexible printed circuit FPC.

FIG. 2 is a block diagram showing a part of the pixel array section 1. The pixel array section 1 shown in FIG. 2 has the pixel TFTs 11 formed in the vicinity of each intersection of the signal lines and the scanning lines, which are vertically and horizontally arranged, liquid crystal capacitors C1 and supplementary capacitors C2 connected between one ends of the pixel TFTs 11 and a Cs, and sensors 12a and 12b for image capturing in groups of two sensors which are provided for each pixel TFT. The sensor 12a and 12b are connected to a not-shown power supply line and a control line shown.

Though there has been shown an example in which two sensors 12a and 12b are provided for each pixel in order to obtain a higher resolution at image capturing, there is no special limitation on the number of the sensors.

FIG. 3 is a circuit diagram showing details of the part shown in FIG. 2. As shown in FIG. 3, the sensor 12a has a photodiode D1 and a transistor Q1 for sensor switching. The sensor 12b has a photodiode D2 and a transistor Q2 for sensor switching. The photodiodes D1 and D2 output electric signals according to the amount of received light. The transistors Q1 and Q2 for sensor switching alternately select either of a plurality of photodiodes D1 or D2 in one pixel.

Each pixel has two sensors 12a and 12b; a capacitor C3 shared with the two sensors 12a and 12b in the same pixel; a buffer (BUF) 13 which outputs binary data corresponding to accumulated charges of the capacitor C3 to a detection line; a transistor Q3 for write control in the buffer 13; and a transistor Q4 by which the buffer 13 and the capacitor C3 are initialized for reset.

The buffer 13 includes a static random access memory (SRAM), two inverters IV1 and IV2 which are serially-connected to each other, a transistor Q5 arranged between the output terminal of the inverter IV2 at the subsequent step and the input terminal of the inverter IV1 at the previous step, and an output transistor Q6, which is connected to the output terminal of the inverter at the subsequent step, for example, as shown in FIG. 4.

When a signal SPOLB is at a high level, the transistor Q5 is turned on, and the two inverters IV1 and IV2 perform a holding operation. When a signal OUTi is at a high level, the held data is output to a detection line.

The display device according to the present embodiment can perform usual display operations, and, also, an image capturing operation, like a scanner. In the case of the usual display operations, the transistor Q3 is set in an off state, and effective data is not stored in the buffer 13. In such a case, a signal line voltage from the signal line drive circuit 2 is supplied to the signal line for display according to the above-described voltage.

On the other hand, when images are captured, an object 22 (for example, a sheet of paper) for image capturing is arranged over the upper surface of an array substrate 21 as shown in FIG. 5, and light from a back light 23 is radiated on the sheet 22 through an opposed substrate 24 and the array substrate 21. The light reflected by the sheet 22 is received by the sensors 12a, 12b on the array substrate 21 for image capturing. In this case, operations for image capturing exert no influences upon display.

The captured image data is stored in the buffer 13 as shown in FIG. 3 to be sent to the logic IC 33 shown in FIG. 1 through the detection line. The logic IC 33 receives a digital signal output from the display device according to the present embodiment for various kinds of computing processing such as reordering of data and noise rejection for the data.

FIG. 6 is a cross section showing structures of the photodiodes D1 and D2 shown in FIG. 3, FIG. 7 is a top view of the photodiodes D1 and D2, FIG. 8 is a perspective view of the photodiodes D1 and D2, and FIG. 9 is a view showing a depletion layer formed in the photodiodes D1 and D2. As shown in FIG. 6 through FIG. 8, the photodiodes D1 and D2 have a silicon film 41 with a thickness of approximately 150 nanometers, which is formed on the glass substrate 21, a semiconductor layer 42 with a thickness of approximately 50 nanometers, which is formed on the silicon film 41, an oxide silicon film 43 (first insulating film) with a thickness of approximately 50 nanometers through 150 nanometers, which is formed on the semiconductor layer 42; a gate electrode 44 with a thickness of approximately 300 nanometers, which is formed on the oxide silicon film 43 and an oxide silicon film 45 which is formed on the gate electrode 44 and the oxide silicon film 43.

The silicon film 43 includes silicon nitride, oxide silicon or a multilayer film thereof, based on a forming method, for example, a plasma chemical vapor deposition (CVD). The semiconductor layer 42 includes polysilicon as a forming material, and has a $p^+$ region 46, a $p^-$ region 47, and a $n^+$ region 48, which are arranged sequentially and adjacently in the horizontal direction of the substrate. Boron ions with a high concentration of, for example, approximately $1\times10^{19}$ atm/cm$^3$ are injected into the $p^+$ region 46. Phosphorus ions with a high concentration of, for example, approximately $1\times10^{19}$ atm/cm$^3$ are injected into the $n^+$ region 48. Boron ions with a low concentration of, for example, approximately $1\times10^{15}$ atm/cm$^3$ are injected into the $p^-$ region 47. The ratio of concentration of the $n^+$ region 48 and $p^-$ region 47 is required to be equal to, or more than ten to the power of two, and preferably, equal to, approximately, ten to the power of four. However, disadvantages, such as extreme bad performance (for example, the mobility) of TFT, which is formed at the same time, are unfavorably caused when the impurity concentration of the $p^-$ region 47 is too low.

The gate electrode 44 has, for example, a MoW (molybdenum-tungsten) alloy. An anode electrode 50 connected to the $p^+$ region 46 through a contact 49, and a cathode electrode 52 connected to the $n^+$ region 48 through a contact 51 are formed On the upper surface of the oxide silicon film 43. The anode electrode 50 and the cathode electrode 52 comprise a multilayer film of Mo (molybdenum) and Al (aluminum), the tip sections thereof has a film thickness of about 600 nanometers. Because a wiring of the anode 50 shields a direct light from a backlight, it is necessary to shield the $p^-$ region 47.

A bias voltage Vnp (=+5V: a potential of n is higher than that of p) is supplied to the anode electrode 50, the cathode electrode 52 is grounded, and a gate voltage Vgp (=−5V: a potential of g is lower than that of p) is supplied to the gate electrode 44.

The photo diodes D1 and D2 according to the present embodiment has the $p^+$ region 46, the $p^-$ region 47, and $n^+$ region 48. Hereinafter, the above structure is called a PPN structure. In FIG. 6, the substrate length of the $p^-$ region 47 in the horizontal direction is formed to be longer than that of either of the $p^+$ region 46 or the $n^+$ region 48. Thereby, a depletion layer 53 formed between the $p^+$ region 46 and the $n^+$ region 48 is extended more widely in the $p^-$ region 47, as shown in FIG. 9, to cause a better efficiency in light-current conversion.

Instead of the $p^-$ region 47, the $n^-$ region 54 may be provided as shown in FIG. 10. Even in this case, the depletion layer 53 is extending more widely through to the n− layer to cause a better efficiency in light-current conversion in the same manner as the above.

Here, it is better not to provide the $n^-$ region between the $p^-$ region 47 and the $n^+$ region 48. In the case of the higher ratio of impurity concentration of the $p^-$ region 47 and the $n^+$ region 48, the more widely the depletion layer 53 is extending in the $p^-$ region 47.

FIG. 11 and FIG. 12 are views showing electrical characteristics of the photo diodes D1 and D2. FIG. 11 shows a relationship between the substrate length (in micrometers) of the $p^-$ region 47 in the horizontal direction (horizontal axis) and the current (in logarithms) flowing in the photo diodes D1 and D2 (vertical axis) when a bias voltage Vnp (=+5V: the potential of n is higher than p) is applied to the anode electrode 50 and Vgp=−5V. FIG. 12 shows a relationship between the gate voltage Vgp (horizontal axis), and the current (in logarithms) flowing in the photo diodes D1 and D2 (vertical axis) when a bias voltage Vnp (=5V) is applied to the anode electrode 50.

FIG. 11 shows two curves in the case when light is radiated; and in the case where light is not radiated. The current in the case where light is not radiated is almost flat, not depending on the length of the $p^-$ region 47. On the other hand, the longer the substrate length of the $p^-$ region 47 is in the horizontal direction, the more the current is increased when light is radiated. The reason is that the depletion layer 53 formed in the photo diodes D1 and D2 is further extending. Thereby, with respect to efficiency of photoelectric conversion, it is found that the longer the substrate length of the $p^-$ region 47 is in the horizontal direction, the more performance of the photo diodes D1 and D2 is improved.

Moreover, though the current of the photo diodes D1 and D2 is increased as shown in FIG. 12 when the gate voltage exceeds about 0 V, the current of the photodiodes D1 and D2 decreases. In order to increase the current at light radiation and decrease dark current, it is suitable to set the gate voltage to be less than 0V.

On the other hand, fluctuation of the currents becomes small when the gate becomes a negative voltage. When the current under no light radiation is decreased, Apparently, it is preferable to make the gate voltage negative. Especially, it is effective to make the gate voltage negative in order to assure normal operation when ambient temperature is high. The reason is that, when the temperature is raised, the current under no light radiation is increased to deteriorate an signal-to-noise ratio. Specifically, the gate voltage may be set at 0 V for a use temperature of 5 degrees centigrade as room temperature, and at −5 V when operation even at a room temperature of 40 degrees centigrade is required. The above temperature control may be manually or automatically done.

FIG. 13 is a view showing the electrical characteristics of the photo diodes D1 and D2, shown in FIG. 6, having the $p^+$ region 46, the $p^-$ region 47, and the $n^+$ region 48, and FIG. 14 is a view, for comparison, showing the electrical characteristics of photo diodes D1 and D2 having the $p^+$ region 46, the $p^-$ region 47, and the $n^+$ region 48. FIG. 13 and FIG. 14 show curves showing changes in the photoelectric current which are caused by changes in the length of the $p^-$ region 47, curves showing changes in the dark current, and curves showing changes in the photoelectric current/dark current.

In general, the more the photoelectric current, the more the photo diodes D1 and D2 can be downsized, thereby improving the aperture ratios of each pixel. Moreover, the smaller the dark current is, the more excellent the signal-to-noise ratio (S/N ratio) is.

As shown in the above drawings, apparently, the photo diodes D1 and D2 shown in FIG. 6 have larger values of the photoelectric current and the photoelectric-current/dark current ratio, than those of the photo diodes D1 and D2 having the $p^+$ region 46, the $p^-$ region 47, the $n^-$ region 54, and the $n^+$ region 48. The photo diodes D1 and D2 have excellent electric characteristics.

Then, steps fabricating the photo diodes D1 and D2, the n channel TFT and the p channel TFT, which are formed on the display device by low-temperature polysilicon processing, will be sequentially explained. Here, the above photo diodes D1 and D2, the n channel TFT, and the p channel TFT are simultaneously formed.

Figure 15:
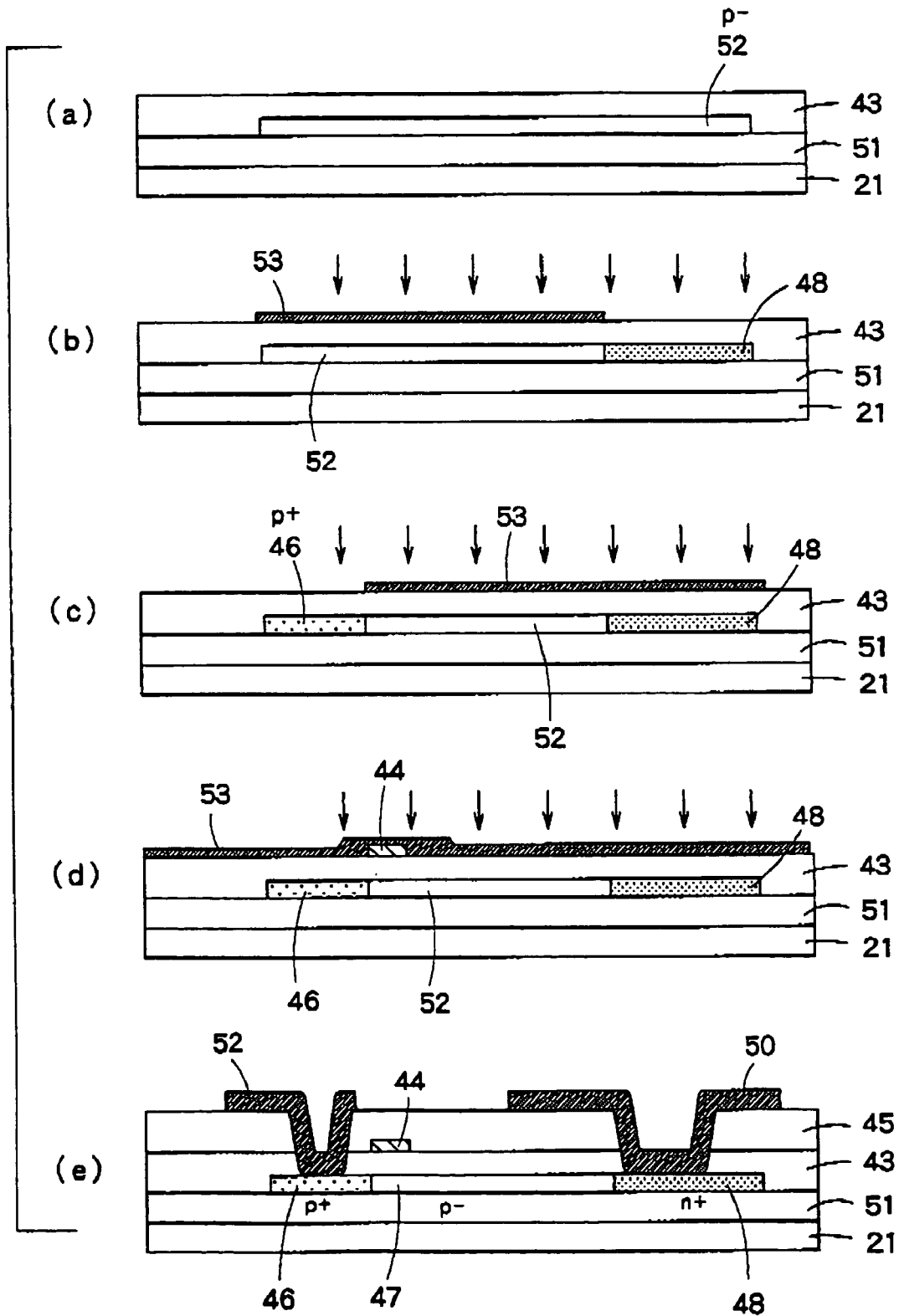
FIG. 15 is a diagram showing fabrication steps of photodiodes.

FIG. 15 is a view showing steps for manufacturing the photo diodes D1 and D2. In the first place, the undercoat layer 51 comprising SiNx, SiOx and the like are formed on the glass substrate 21 by the CVD method. Then, an amorphous silicon film is formed on the undercoat layer 51 by a plasma-enhanced chemical-vapor deposition (PECVD) method, a sputtering method, and the like. Subsequently, a laser beam is radiated on the amorphous silicon film for crystallization to form the polysilicon film 52. In the next place, after patterning of the polysilicon film 52, the first insulating layer 43 comprising the SiOx film is formed on the upper surface of the patterned polysilicon film 52, using the PECVD method, an electron cyclotron resonance-chemical vapor deposition (ECR-CVD) method, and the like. Moreover, boron ions with a low concentration are injected into the vicinity of regions in which the photo diode D1 and D2 are formed in the polysilicon film 52, in order to form the p– region 52 (FIG. 15(a)).

Then, phosphorus ions are injected into a part of the polysilicon film, using the resist 53, and the like as a mask, in order to the n$^+$ region 48 (FIG. 15(b)). Subsequently, boron ions are injected into a part of the polysilicon film, in order to the p+ region 46 (FIG. 15(c)).

Subsequently, the first metallic layer is deposited on the upper surface of the first insulating layer 43, and the first gate electrode 44 is formed after patterning. In the next place, using a resist as a mask, boron ions are injected as impurities into the regions in which the photo diode D1 and D2 are formed, and the p$^+$ region 46 is formed on a part of the polysilicon film (FIG. 15(d)).

Then, phosphorus ions with a low concentration are injected into a polysilicon film which is a part of the n channel TFT, using a resist as a mask. At this time, there is formed no n– region, because the PPN element is masked with the resist.

Subsequently, the p– region 47 is hydrogenated. Here, the hydrogenation means a step at which the substrate is exposed in the plasma of hydrogen. This step is done, using a CVD device. Dangling bonds in the channel region of TFT formed of a polysilicon film are ended by the hydrogenation to control the leak current of the TFT. When the substrate is exposed to the plasma of hydrogen, the hydrogen is interrupted by the gate electrode 44, and indirectly gets into the polysilicon film from a portion in which the gate electrode 44 does not exists.

Then, the second insulating layer 45 is formed on the first insulating layer 43. Subsequently, in order to form electrodes for the photo diodes D1 and D2, contact holes are formed, the p$^+$ region 46 and the n+ region 48 are exposed, a second metallic layer is deposited on the exposed region, and the layer is patterned into a predetermined shape (FIG. 15(e)).

Figure 16:
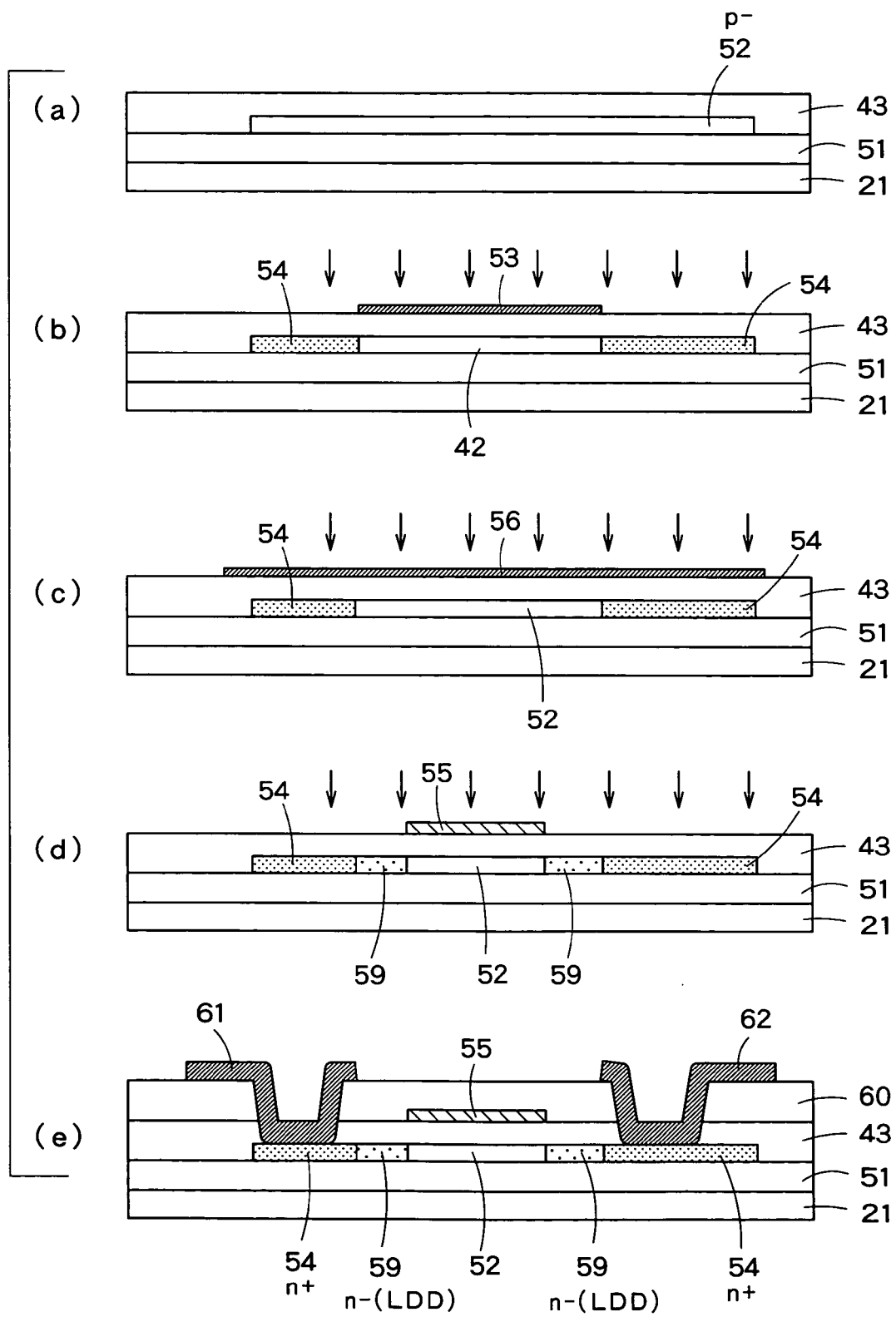
FIG. 16 is a diagram showing fabrication steps of n channel TFT.
Figure 17:
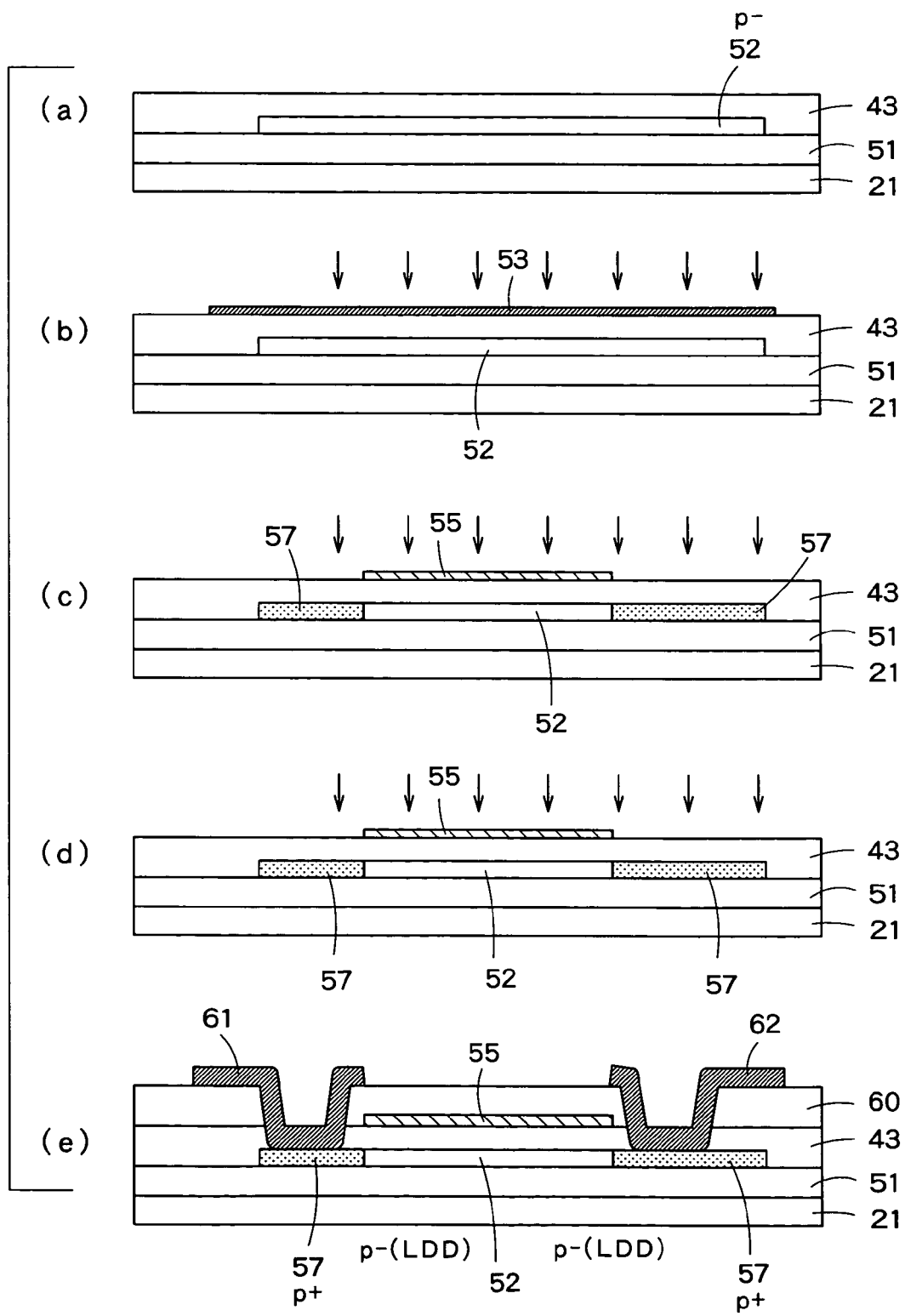
FIG. 17 is a diagram showing fabrication steps of p channel TFT.

On the other hand, FIG. 16 is a view showing a step for manufacturing the n channel TFT, and FIG. 17 is a view showing a step for manufacturing the p channel TFT. Hereinafter, the steps for manufacturing the n channel TFT and the p channel TFT will be explained, referring to FIG. 16 and FIG. 17.

In the first place, the undercoat layer 51 comprising SiNx, SiOx, and the like is formed on the glass substrate 21, using the CVD method. Then, an amorphous silicon film is formed on the undercoat layer 51, using the By the PECVD method, the sputtering method, and the like, a laser beam is radiated on the amorphous silicon film for crystallization to form the polysilicon film 52. Subsequently, after patterning of the polysilicon film 52, the first insulating layer 43 comprising the SiOx film, which is formed by the PECVD method, the ECR-CVD method, and the like, is formed on the upper surface of the patterned polysilicon film 52. And, boron ions with a low concentration are injected as impurities into the n-channel-TFT forming region and the p-channel-TFT forming region in the polysilicon film 52, in order to the p– region 52 (FIG. 16(a) and FIG. 17(a)).

In the next place, using the resist 53 as a mask, phosphorus ions are injected into the n-channel-TFT forming region, and the n+ region 54 is formed on a part of the polysilicon film (FIG. 16(b)). Moreover, using the resist 53, the p-channel TFT forming region is protected so that the phosphorous ions are not injected therein (FIG. 17(b)).

Then, using Mo—Ta, Mo—W, and the like, the first metallic layer is deposited on the upper surface of the first insulating layer 43 in the p-channel-TFT forming region, and a gate electrode 55 is formed by patterning of the metallic layer.

Subsequently, using a resist 56 as a mask, boron ions are injected as impurities into the p-channel-TFT forming region, and a p+ region 57 is formed (FIG. 17(c)). At this time, the n-channel-TFT forming region is covered with a first metal layer 56 so that the boron ions are not to be injected therein (FIG. 16(c)).

Then, after the gate electrode 55 is formed in the n-channel-TFT forming region, phosphorus ions with a low concentration are injected into the n-channel-TFT forming region, using a resist 58 as a mask, in order to an n– region 59. The polysilicon film which is located just under a portion masked with the resist 58 is left as the p– region 52 (FIG. 16(d)).

Subsequently, dangling bonds in the channel region of TFT in the polysilicon film are ended by the hydrogenation in the CVD device to control the leak current of the TFT.

Then, a second insulating layer 60 is formed in the same CVD device on the upper surface of the first insulating layer 43 comprising SiOx. Subsequently, contact holes are formed in an electrode forming region of the n channel TFT and an electrode forming region of the p channel TFT, respectively, and second metallic layers are deposited in the above contact holes. Subsequently, the second metallic layers are patterned to form a source electrode 61 and a drain electrode 62. Finally, a SiN film is formed as a passivation film, and the n channel TFT and the p channel TFT are completed (FIG. 16(e) and FIG. 17(e)).

As described above, in the present embodiment, a low concentration region comprising the p– region 47 or the n– region area is formed between the p+ region 46 and the n+ region 48 forming the photo diodes D1 and D2, and the depletion layer 53 formed between the p+ region 46 and the n+ region 48 is extended longer into the low concentration region in order to realize that the substrate length of the low concentration region in the horizontal direction is longer than that of the p+ region 46 or the n+ region 48. Thereby, a photoelectric current is increased to raise the photoelectric conversion efficiency and, at the same time, the signal-to-noise ratio ca be improved.

Here, though the example in which the photoelectric conversion devices have the photo diodes has been explained in the above embodiment, the devices may be composed of TFT. In this case, the same advantages as those of the above-described embodiment can be obtained by setting the gate length of the TFTs forming the photoelectric conversion device to be longer than those of other TFTs (TFTs for pixel display, driving circuit, and the like).

Figure 18:
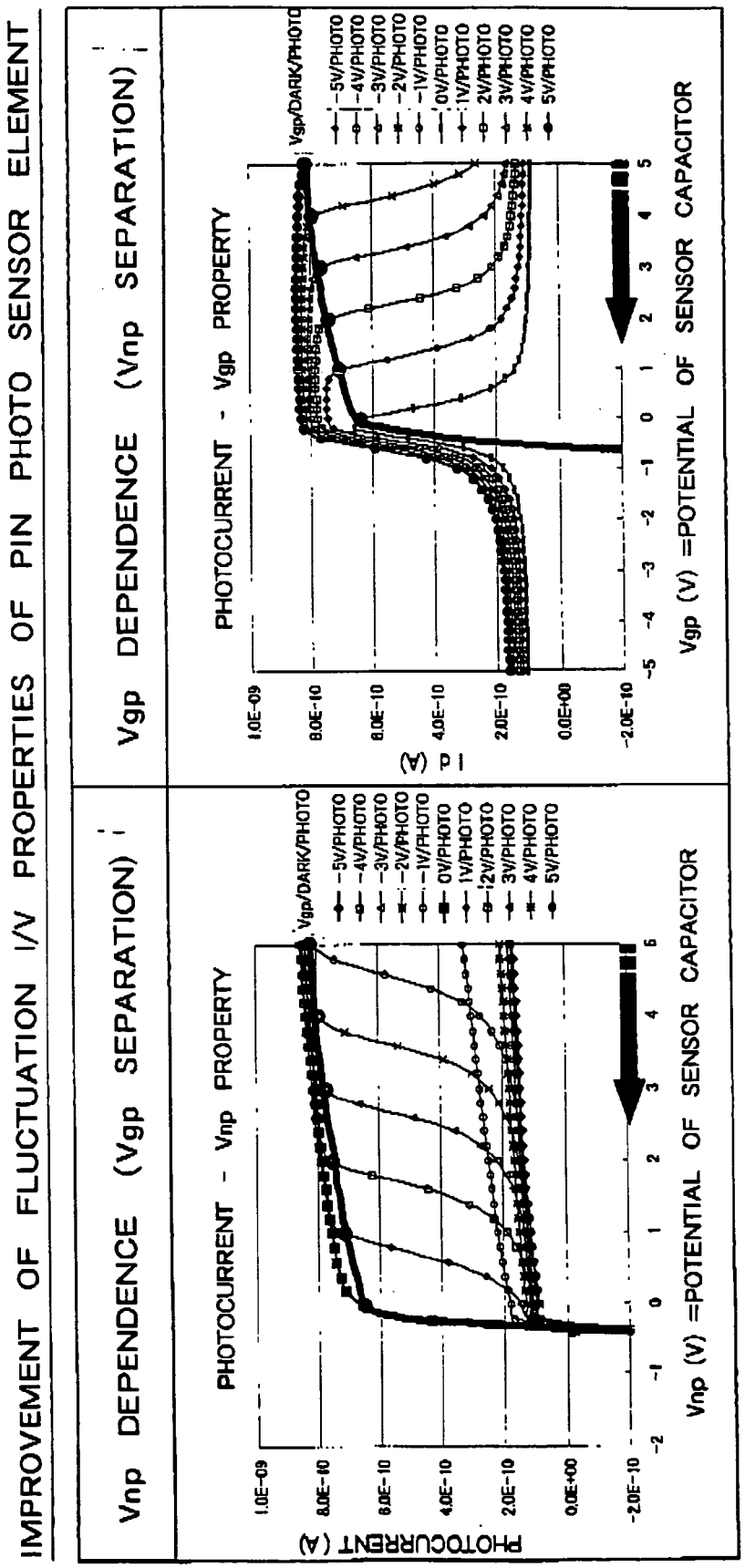
FIG. 18 is a diagram showing I-V property of a photodiode in the case of Vgp=Vnp.

Furthermore, when the bias voltage Vnp of the photodiode and the gate voltage Vgp are set to be Vgp=Vnp, it is possible to decrease the fluctuation of the current. More specifically, the gate electrode is connected to the n+ side electrode. FIG. 18 is a view showing I-V property of the photodiode in the case of Vgp=Vnp. Solid lines of FIG. 18 express characteristic curves of Vgp=Vnp.

(Second Embodiment)

A second embodiment is characterized in that a light shielding layer is arranged so that a light leak current does not flow in the photo diodes for image capturing.

FIG. 19 is a view showing a structural cross section of a display device according to the second embodiment of the present invention. As shown in the drawing, the display device has a configuration in which a back light (B/L) is arranged under an array substrate 21, and a liquid crystal layer 23 is inserted between an opposed substrate 24, which is arranged above the substrate 21, and the substrate 21. An object 25 (for example, printed surface of a sheet of paper) for image capture is arranged above the opposed substrate 24.

Light from the back light 22 is radiated on the object 25 for image capture, passing through the array substrate 21 and the opposed substrate 24. The reflection light from the object 25 for image capturing is received at the photo diodes D1 and D2 on the array substrate 21 for image capturing. In this case, there is no possibility that operations for image capturing exert any influences upon display.

After the captured image data is stored in a buffer 13 as shown in FIG. 3, the data is sent to a logic IC 33 shown in FIG. 1 through a detection line. This logic IC 33 receives a digital signal output from the display device in the present embodiment for computing processing such as reordering of data and noise rejection for the data.

In the present embodiment, a light shielding layer 20 is arranged on the lower side of the photo diodes D1 and D2 so that a light leak current does not flow in the photo diodes D1 and D2 when the photo diodes D1 and D2 formed in the array substrate 21 receive light directly from the back light 22.

Incidentally, in a display device for electronic equipment, such as a cellular telephone, used in an environment in which the equipment easily receives outdoor daylight, a reflecting electrode, which reflects the outdoor daylight, has been installed in order to secure good legibility for the display device even under strong outdoor daylight.

The structural cross section of the display device according to the present embodiment when the unit is provided with a reflecting electrode is shown in FIG. 20, and FIG. 21 shows the plan view of the unit.

As shown in FIG. 20 and FIG. 21, one end of the reflecting electrode 26 arranged at a higher position than that of a transparent electrode 27 on the array substrate 21 is connected to the electrode 27. As shown in the plan view of FIG. 21, the reflecting electrode 26 is formed along the periphery of a pixel. The outdoor daylight is reflected by the reflecting electrode 26, passing through the opposed substrate 24. In this case, the brightness of each pixel is in proportion to the product of "intensity of outdoor daylight" and "transmittance of the liquid crystal layer". The transmittance of the liquid crystal layer is changed according to the voltage applied to the pixel electrode concerned. An arbitrary pattern can be displayed by changing voltages applied to pixel electrodes for each pixel.

On the other hand, FIG. 22 is a cross sectional view of a case in which the relation between the position of the array substrate 21 and that of the opposed substrate 24 is obtained by reversing that of FIG. 20, and FIG. 23 is a plan view of the case. In this case, a reflecting electrode 26 is arranged at the side of the opposed substrate 24. More specifically, the aperture ratio becomes worse because the reflecting electrode 26 is provided in the vicinity of the center of the pixel as shown in the plan view of FIG. 23. The aperture ratio of FIG. 21 is better than that of FIG. 23.

Though a TFT (for pixel display and for a driving circuit) and a photodiode are formed, using polysilicon processing, in the present embodiment, the crystallinity of a semiconductor layer comprising polysilicon is intentionally deteriorated, compared with a usual TFT when the photodiode is formed. The reason is that, while it is preferable in the case of a TFT to increase an ON-state current by promoting crystallization of a polysilicon film, a wider wavelength spectrum can be absorbed when crystallization of a polysilicon film is not promoted, and the photoelectric conversion efficiency is improved in the case of a photodiode. That is, the reason is that the photoelectric conversion can be realized even for light with various kinds of wave lengths when many kinds of energy gaps exist in a state in which the crystallization is not promoted, though a light leak current is caused by generation of an electron and a electron hole when there is incident light with larger energy than predetermined energy gap Eg.

Moreover, as shown in FIG. 24 as an enlarged view, a light shielding layer 20 comprising a metallic film is arranged under the photo diodes D1 and D2 in the present embodiment. Accordingly, it becomes more difficult, in comparison with a case in which the light shielding layer 20 is not provided, to promote the crystallization of amorphous silicon, as laser energy escapes from an amorphous silicon through the light shielding layer 20 when polysilicon is formed by radiating a laser beam on the amorphous silicon film in the regions in which the photo diodes D1 and D2 are formed. Thereby, even without special technique in manufacturing, the crystallinity of a semiconductor layer of the photo diodes in the present embodiment can be worse than that of the TFT.

Here, the bad crystallinity means that the amount of fluctuation of the crystal size becomes large, or the defect density is high.

Then, steps for fabricating the photo diodes D1 and D2, the n channel TFT, and the p channel TFT, which are formed on the display device by polysilicon processing, will be sequentially explained. Here, the above photo diodes D1 and D2, the n channel TFT, and the p channel TFT are simultaneously formed.

Figure 25:
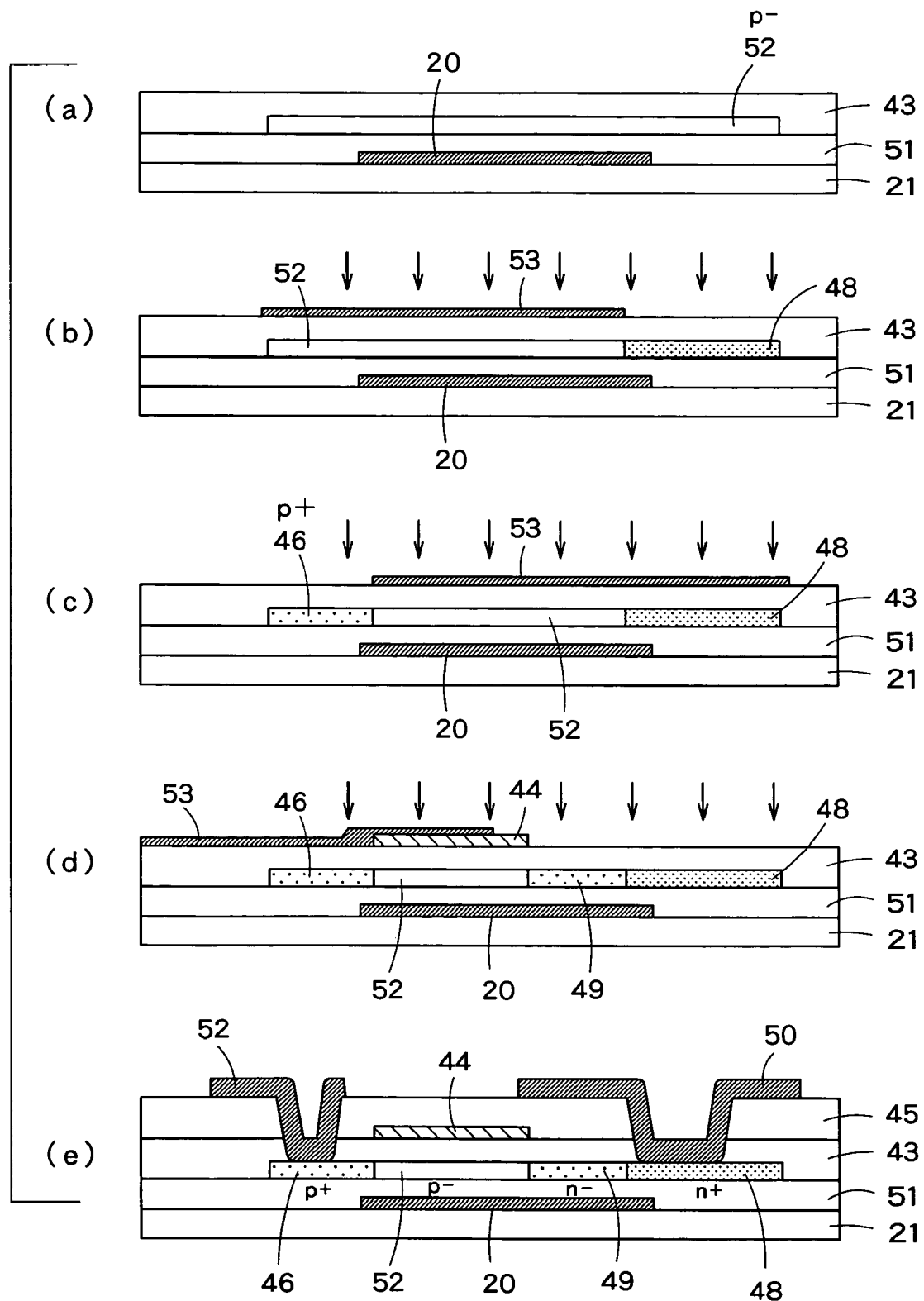
FIG. 25 is a diagram showing fabrication steps of photodiodes.

FIG. 25 is a view showing steps for fabricating the photo diodes D1 and D2.

In the first place, a undercoat layer 51 having SiNx, SiOx, and the like are formed on the glass substrate 21 by the CVD method after the light shielding layer 20 is formed on the glass substrate 21. Then, an amorphous silicon film is formed on the undercoat layer 51 by the PECVD method, the sputtering method, and the like. Subsequently, a laser beam is radiated on the amorphous silicon film for crystallization to form a polysilicon film 52. At this time, as there is provided the light shielding layer 20 as described above, the laser energy escapes to the light shielding layer 20 even without preparing conditions of laser radiation separately for the TFT section and the photo diode section, and it becomes more difficult to promote the crystallization of the amorphous silicon film.

Then, after patterning of the polysilicon film 52, a first insulating layer 43 having a SiOx film is formed on the upper surface of the patterned polysilicon film 52, using the PECVD method, the ECR-CVD method, and the like. Moreover, boron ions with a low concentration are injected into the vicinity of regions in which the photo diode D1 and D2 are formed, and the p− region 52 is formed (FIG. 25(*a*)).

Subsequently, phosphorus ions are injected into a part of the polysilicon film, using the resist 53, and the like as a mask, and the n+ region 48 is formed (FIG. 25(*b*)). Then, boron ions are injected into a part of the polysilicon film, and the p+ region 46 is formed (FIG. 25(*c*)).

Then, the first metallic layer is deposited on the upper surface of the first insulating layer 43, and a first gate electrode 44 is formed by patterning of the metallic layer. Then, phosphorus ions with a low concentration are injected into a polysilicon film which is a part of the n channel TFT, using a resist as a mask, in order to form an n− region 49.

Subsequently, the p− region 52 is hydrogenated. Here, the hydrogenation means a step at which the substrate is exposed in the plasma of hydrogen. This step is done, using a CVD device. Dangling bonds in the channel region of TFT formed of a polysilicon film are ended by the hydrogenation to control the leak current of the TFT. When the substrate is exposed to the plasma of hydrogen, the hydrogen is interrupted by the gate electrode 44, and indirectly gets into the polysilicon film from a portion in which the gate electrode 44 does not exists.

Then, a second insulating layer 45 is formed on the first insulating layer 43. Subsequently, in order to form electrodes for the photo diodes D1 and D2, contact holes are formed, the p+ region 46 and the n+ region 48 are exposed, a second metallic layer is deposited on the exposed region, and the layer is patterned into a predetermined shape to form the anode electrode 50 and the cathode electrode 52 (FIG. 25(*e*)).

Thus, as the back light 22 is arranged under the array substrate 21, and the light shielding layer 20 is arranged on the lower side of the photo diodes D1 and D2 in the array substrate 21 in the present embodiment, there is no possibility that light directly from the back light 22 gets into the photo diodes D1 and D2, and the light leak current can be controlled.

Moreover, as the crystallinity of the semiconductor layer which is formed of polysilicon and constitutes the photodiodes is intentionally deteriorated, a wider wavelength spectrum can be absorbed, and the photoelectric conversion efficiency can be improved.

Though an example in which the photo diodes D1 and D2 having the p+ region 46, the p− region 52, the n− region 49 and the n+ region 48 are formed in the above-described embodiment mentioned has been explained, a configuration in which a photo diode without the p− region 52 and the n− region 49 is formed may be applied. For example, when a photo diode has the p+ region 46, the p− region 52, and the n+ region 48, the depletion layer 53 is extended into the p− region 52 by a configuration in which the p− region 52 is longer than other regions 46 and 45. Accordingly, the photoelectric conversion efficiency can be raised, and, at the same time, the signal-to-noise ratio can be also improved.

Here, though the example in which the photoelectric conversion devices have the photo diodes has been explained in the above embodiment, the elements may comprise TFT. In this case, the same advantages as those of the above-described embodiment can be obtained by a configuration in which the gate length of the TFT forming the photoelectric conversion device is longer than those of other TFTs (TFTs for pixel display, driving circuit, and the like).

(Third Embodiment)

A third embodiment has a configuration having the smaller area of a light shielding layer which shields direct ray of light from a back light.

Figure 26:
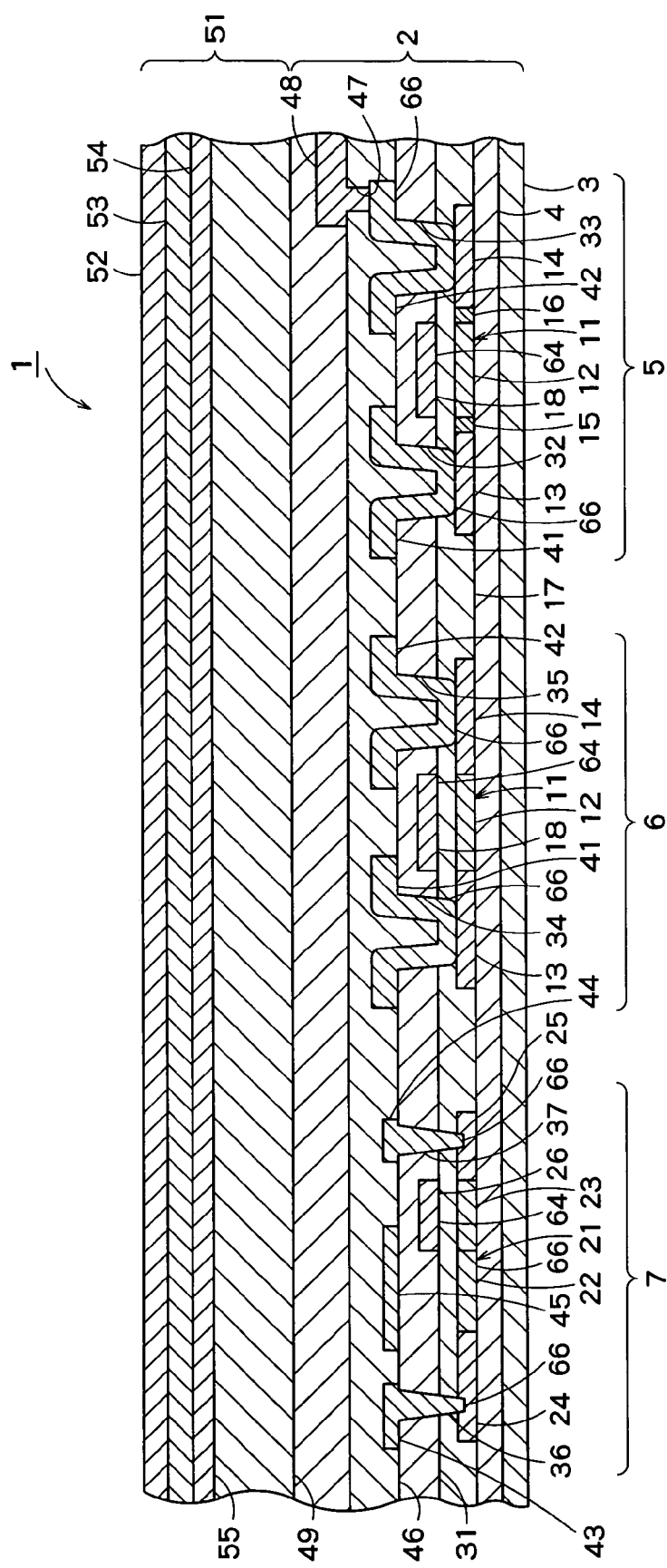
FIG. 26 is a cross section view showing a liquid crystal display according to a third embodiment of the present invention.

FIG. 26 is a cross sectional view of a display device according to the third embodiment of the present invention.

FIG. 26 shows a structural cross section structure of a liquid crystal display device 101 as one example of the display device. The liquid crystal display device 101 shown in FIG. 26 is provided with an image capturing function. This liquid crystal display device 101 comprises an array substrate 102, which is of an active matrix type, and has a shape of a substantially rectangular plate, as a circuit board. This array substrate 102 includes a glass substrate (transparent substrate) 103 which is a substantially transparent insulating substrate with a shape of a substantially rectangular plate. An undercoat layer 104 having a silicon nitride film (SiNx), an oxide silicon film (SiOx), and the like is formed on one principal plane of the glass substrate 103. This undercoat layer 104 prevents impurities, which has been formed on the glass substrate 103, from diffusing to each element.

A thin film transistor (TFT) of an n channel (n-ch) type for pixel display, a thin film transistor 106 of a p channel (p-ch) type for pixel display, and a photoelectric conversion device (light sensor) 7 for image capturing are formed on the undercoat layer 104 in a matrix state.

Each of these thin film transistors 105 and 106 has an active layer (semiconductor layer) of a p− region 111 formed on the undercoat layer 104. The active layer 111 comprises a polycrystalline semiconductor (polysilicon). The polysilicon in the active layer 111 is formed by crystallization through laser annealing of amorphous silicon.

A channel region 112 is formed in the center of the active layer 111. On both sides of the channel region 112, a source region 113 and a drain region 114, which comprise an n+ region, or a p+ region, are arranged, opposing to each other. Lightly doped drain (LDD) regions of an n− region 115 and 116 are formed between the channel region 112 in the thin film transistor 105 of an n channel type and the source region 113, and between the region 112 and the drain region 114, respectively.

A gate insulating film 117 (silicon oxide film) with a insulating performance is formed on the undercoat layer 104 including the channel region 112, the source region 113, the drain region 114, and the LDD areas 115, and 116.

A gate electrode 118 comprising a first metal is formed on the gate insulating film 117 opposing to the channel region 112. The gate electrode 118 is opposing to channel region 112 of the thin film transistor 105 or 106 through the gate insulating film 117, and has a dimension in the breadth substantially equal to that of the channel region 112.

On the other hand, a light sensor 107 of a PIN type is formed on the undercoat layer 104 at a location adjacent to that of the thin film transistor 106. The light sensor 107 is formed in the same manufacturing steps as those of the thin film transistor 105 or 106, and is arranged to be in the flat with the thin film transistor 105 or 106 on the glass substrate 103.

The light sensor 107 is formed of amorphous silicon, and is provided with a light receiving section 121 of an I layer in a photoelectric conversion section. The light receiving section 121 is formed in the same steps as those of the active layer 111 in the thin film transistor 105 or 106, and is laminated on the undercoat layer 104. The light receiving section 121 is provided with a first light receiving section 122 and a second light receiving section 123, which has a p− region.

Figure 27:
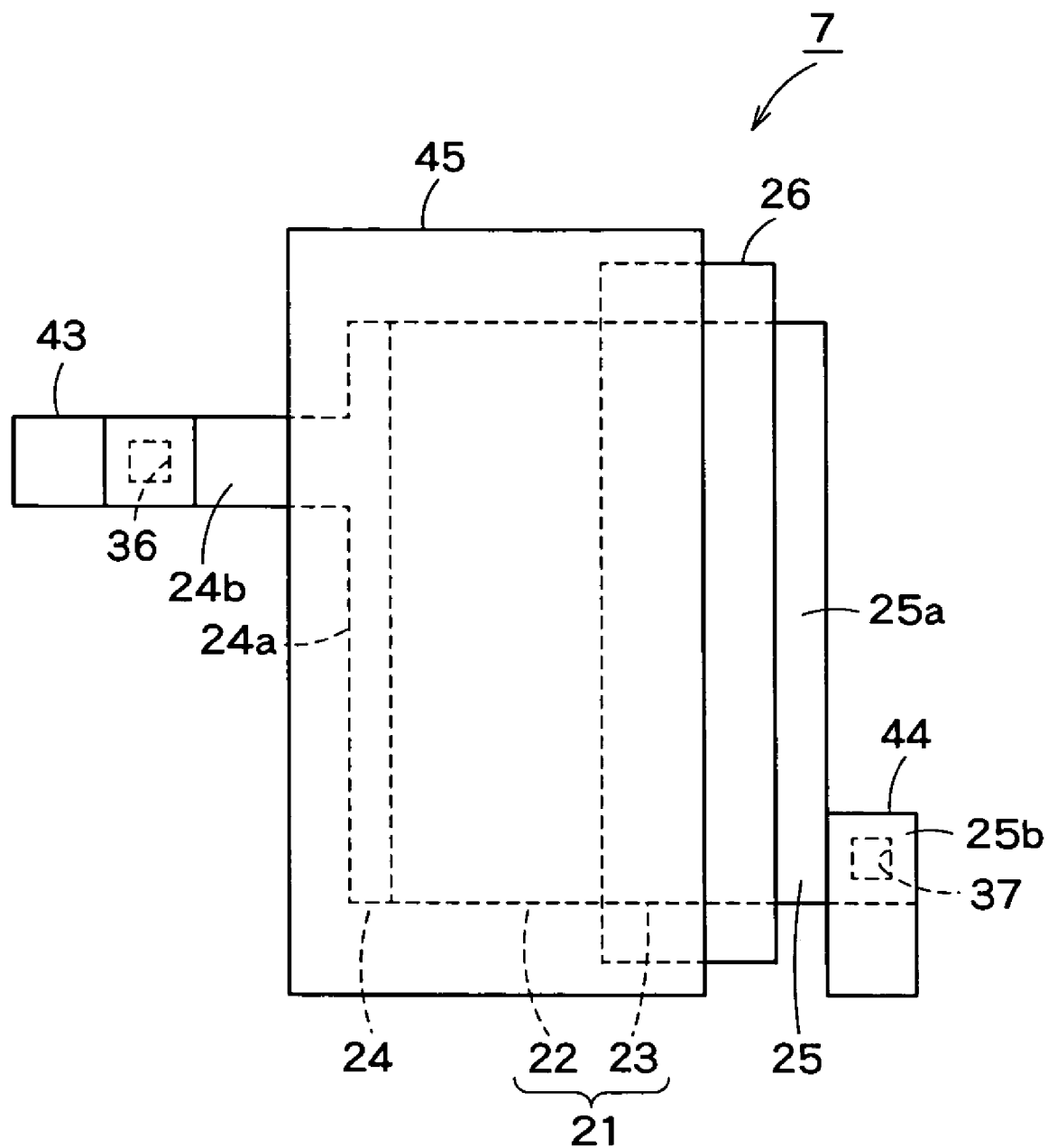
FIG. 27 is a top view showing a photo sensor in the liquid crystal display of FIG. 26.

FIG. 27 is a top view of the vicinity of the light receiving section 121. As shown in FIG. 27, the first light receiving section 122 and the second light receiving section 123 have a shape of a slender and rectangular plate with a substantially similar area to each other, and sides of the both sections, which are opposing to each other in the breadth direction, are electrically connected with each other.

An n+ region 124 which comprises polysilicon, and acts as an n type electrode region is provided at the other side of the second light receiving section 123 across the first light receiving section 122. The n+ region 124 is provided with a connecting piece 124a with a shape of a slender and rectangular plate having a substantially similar longitudinal dimension to that of the first light receiving section 122. The longitudinal direction of the connecting piece 124a is substantially parallel to that of the first light receiving section 122, and one of end sections of the connecting piece 124a in the breadth direction is connected with that of the first light receiving section 122 in the breadth direction for electrical connection.

A conducting piece 124b with a shape of a slender and rectangular plate, which is extending along the breadth direction of the connecting piece 124a, is provided at the other end section of the connecting piece 124a in the breadth direction. The conducting piece 124b is protruded along the breadth direction of the connecting piece 124a from the other end section of the connecting piece 124a in the breadth direction. The conducting piece 124b is provided near at one end of the connecting piece 124a in the longitudinal direction.

An p+ region 125 which is formed of polysilicon, and acts as an p type electrode region is provided at the other side of the first light receiving section 122 across the second light receiving section 123. The p+ region 125 is provided with a connecting piece 125a with a shape of a slender and rectangular plate having a substantially similar longitudinal dimension to that of the second light receiving section 123. The longitudinal direction of the connecting piece 125a is substantially parallel to that of the second light receiving section 123, and one of end sections of the connecting piece 125a in the breadth direction is electrically connected with that of the second light receiving section 123 in the breadth direction for electrical connection.

A conducting piece 125b with a shape of a slender and rectangular plate, which is extended along the breadth direction of the connecting piece 125a, is provided at the other end section of the connecting piece 125a in the breadth direction. The conducting piece 125b is protruded along the breadth direction of the connecting piece 125a from the other end section of the connecting piece 125a in the breadth direction. The conducting piece 125b is provided at the other end section of the connecting piece 125a in the longitudinal direction.

Here, the n+ region 124 and the p+ region 125 are used as a pair of electrode sections for the light sensor 107. Each of the n+ region 124 and the p+ region 125 is formed on the undercoat layer 104 which is the same layer as those of the first light receiving section 122, and the second light receiving section 123.

As shown in FIG. 26, the gate insulating films 117 are formed on the upper surfaces of the first light receiving section 122, the second light receiving section 123, the n+ region 124 and p+ region 125, and the undercoat layer 104. According to the same steps as those of the gate electrode 118 in the thin film transistor 105 or 106, the gate electrode 126 formed in the same layer is formed on the gate insulating film 117 opposing to the second light receiving section 123. The gate electrode 126 has a breadth direction substantially equal to that of the second light receiving section 123, and comprises first metal. That is, the gate electrode 126 is provided above the second light receiving section 123 through the gate insulating film 117, and covers the second light receiving section 123.

An interlayer insulating film 131 (silicon oxide film) of a second insulating layer is formed on the gate insulating film 117 including the gate electrode 126, and the gate electrode 118 of the thin film transistor 105 or 106. And, a plurality of contact holes 132, 133, 134, 135, 136, and 137 penetrating through each of the interlayer insulating film 131 and the gate insulating film 117 are provided in the interlayer insulating film 131 and the gate insulating film 117, respectively.

The contact holes 132 and 133 are provided on the source region 113 and the drain region 114 arranged on both side of the gate electrode 118 in the n channel type thin film transistor 105, respectively. The contact hole 132 is open and connected with the source region 113 of the n channel type thin film transistor 105. The contact hole 133 is open and connected with the drain region 114 of the n channel type thin film transistor 105.

The contact holes 134 and 135 are provided on the source region 113 and the drain region 114 arranged on both side of the gate electrode 118 in the p channel type thin film transistor 106, respectively. And, the contact hole 134 is open and connected with the source region 113 of the p channel type thin film transistor 106. The contact hole 135 is open and connected with the drain region 114 of the p channel type thin film transistor 106.

The contact holes 136 and 137 are provided on the n+ region 124 and the p+ region 125 arranged on both side of the light receiving section 121 in the light censor 107, respectively. The contact hole 136 is open and connected with an intermediate section at the tip section in the breadth direction along the longitudinal direction of the conducting piece 125b in the n+ region 124. The contact hole 137 is open and connected with an intermediate section at the tip section in the breadth direction along the longitudinal direction of the conducting piece 125b in the p+ region 125.

Source electrodes 141 which are a signal line are provided in the contact holes 132 and 134 connected with the source regions 113 of the thin film transistors 105 and 106, respectively. These source electrodes 141 are formed of a second metal, and are electrically connected for conduction to the source regions 113 in the thin film transistors 105 and 106 through the contact holes 132 and 134.

Drain electrodes 142 which are a signal line are provided in the contact holes 133 and 135 connected with the drain regions 114 of the thin film transistors 105 and 106, respectively. These source electrodes 142 are formed of a second metal, and are electrically connected for conduction to the drain regions 114 in the thin film transistors 105 and 106 through the contact holes 133 and 135.

An n type electrodes 143 which has the second metal are laminated, and are provided in the contact hole 136 in connected with the n+ region 124 in the light sensor 107. The n type electrode 143 is electrically connected for conduction to the conducting piece 124b in the n+ region 124, and has a function as a cathode of the light sensor 107. As shown in FIG. 27, the n type electrode 143 is protruded on the interlayer insulating film 131 toward the side of the tip of the conducting piece 124b in the n+ region 124 in the longitudinal direction.

A p type electrode 144 formed of the second metal is provided in the contact hole 137 connected with the p+ region 125 in light sensor 107. The p type electrode 144 is electrically connected for conduction to the conducting piece 124b in the p+ region 125, and has a function as an anode of the light sensor 107. The p type electrode 144 is protruded on the interlayer insulating film 131 toward the side of the other end of the conducting piece 125b in the p+ region 125 in the longitudinal direction.

A light shielding layer 145 with a shape of a slender and rectangular plate is formed on the interlayer insulating film 131 opposing to the first light receiving section 122 in the light sensor 107. This light shielding layer 145 is arranged in order to shield light directly from a not shown back light arranged at the back side of the opposed substrate 151.

The light shielding layer 145 is arranged, opposing to the first light receiving section 122, so that light is shielded only for the first light receiving section only 122. The light shielding layer 145 is extended along the longitudinal direction of the first light receiving section 122, and the longitudinal dimension of the layer 145 is longer than that of the first light receiving section 122. The breadth dimension of the lightproof layer 145 is wider than that of the first light receiving section 122. That is, the light shielding layer 145 covers in the breadth direction from the n+ region 124 at the side of the first light receiving section 122 to the second light receiving section 123 at the side of the first light receiving section 122 by centering on the first light receiving section 122.

In other words, the light shielding layer 145 covers approximately one third at back-end side of the conducting piece 124b in the n+ region 124 in the longitudinal direction, the connecting piece 124a in the n+ region 124, the first light receiving section 122, and approximately one half of one side of the second light receiving section in the breadth direction. That is, the light shielding layer 145 exposes at least a part of the second light receiving section 123 and that of the p+ region 125.

The longitudinal dimension of the light shielding layer 145 is longer than that of the gate electrode 126 in the light sensor 107. Moreover, the light shielding layer 145 is located so that the center of the layer 145 in the longitudinal section is coincided with the longitudinal centers of the connecting piece 124a in the n+ region 124, the first light receiving section 122, and the second light receiving section 123. Thereby, the light shielding layer 145 is protruded in the longitudinal direction of the first light receiving section 122 from the both ends of the connecting piece 124a in the n+ region 124, the first light receiving section 122, and the second light receiving section 123.

That is, the light shielding layer 145 covers a part of the n+ region 124 and that of the second light receiving section 123 by centering on the first light receiving section 122 so that light directly from the not shown back light through the opposed substrate 151 is securely prevented from entering the first light receiving section 122.

In other word, the light shielding layer 145 is arranged so that the second light receiving section 123 at the side of the p+ region 125 and the p+ region 125 are exposed upward, respectively. That is, the light shielding layer 145 does not cover approximately one half of the second light receiving section 123 at the other side in the breadth direction and the p+ region 125. The light shielding layer 145 expose upward approximately one half of the second light receiving section 123 at the other side in the breadth direction and the p+ region 125, respectively.

Furthermore, the light shielding layer 145 is formed of the second metal which is also used for the n type electrode 143 and the p type electrode 144. That is, the light shielding layer 145 is formed in the same steps as those of the n type electrode 143 and the p type electrode 144. Accordingly, the light shielding layer 145 is formed on the interlayer insulating film 131 which is the same layer as each of the n type electrode 143 and the p type electrode 144.

On the other hand, a passivation film 146 made of a silicon nitride film is formed on the interlayer insulating film 131 including the source electrodes 141 and the drain electrodes 142 of the thin film transistors 105 and 106, the n type electrode 143 and the p type electrode 144 of the light sensor 107, and the light shielding layer 145 so that the thin film transistors 105 and 106, and the light sensor 107 are covered.

A contact hole 147 penetrating through the passivation film 146 is provided in the film 146. The contact hole 147 is open and connected with the source electrode 141 in the n channel type thin film transistor 105.

A pixel electrode 148 is formed on the passivation film 146 including the contact hole 147. The pixel electrode 148 is electrically connected to the source electrode 141 of the n channel type thin film transistor 105 through the contact hole 147.

Here, the pixel electrode 148 is controlled by the n channel type thin film transistor 105. An alignment film 149 is formed on the passivation film 146 including the pixel electrode 148.

On the other hand, the opposed substrate 151 with a shape of a rectangular plate, which is opposing to the array substrate 102, and acting as a common substrate, is disposed. The opposed substrate 151 is provided with a glass substrate 152 with a shape of a substantially transparent and rectangular plate. An opposed electrode 153 is provided as a common electrode on one principal plane at the side opposing to the array substrate 102 on the glass substrate 152. An alignment film 154 is formed on the opposed electrode 153. A liquid crystal 155 is inserted under sealing between the alignment film 154 on the opposed substrate 151 and the alignment film 149 on the array substrate 102.

A not-shown back light is disposed as a back light source, opposing to the side at which the opposed substrate 151 is disposed opposing to the array substrate 102. The array substrate 102 is exposed to plane-like light with the back light, and an image displayed on the array substrate 102 becomes visible by control of the pixel electrode 148 through the thin film transistors 105 and 106 on the array substrate 102.

Figure 28:
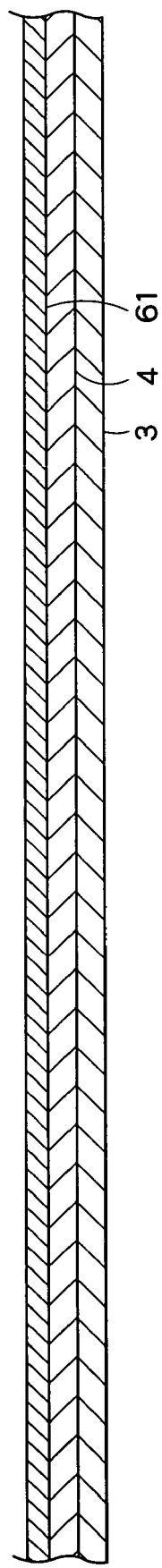
FIG. 28 is a cross section view showing state forming an amorphous silicon film on a transparent substrate of the liquid crystal display of FIG. 26.

FIG. 29 through FIG. 37 are views showing steps for manufacturing a liquid crystal display device according to the third embodiment. Hereinafter, a method of manufacturing the liquid crystal display device according to the present embodiment will be explained, referring to the drawings. In the first place, the undercoat layer 104 comprising a silicon nitride film (SiNx), an oxide silicon film (SiOx), and the like is formed on the glass substrate 103 as a step for plasma CVD according to a plasma CVD method, as shown in FIG. 28.

Then, an amorphous silicon film 161 of an amorphous semiconductor layer is deposited to a thickness of approximately 50 angstrom on the glass substrate 103 according to the PECVD method, or the sputtering method.

Figure 29:
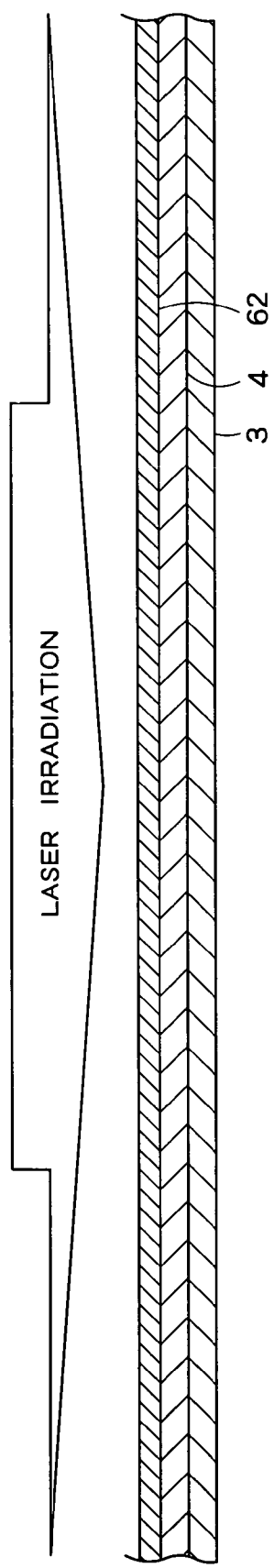
FIG. 29 is a cross section view showing fabrication steps of a liquid crystal display of FIG. 27.

Thereafter, an excimer laser beam is radiated on the amorphous silicon film 161 as a laser radiation step as shown in FIG. 29 for laser annealing, and the amorphous silicon film 161 is crystallized to obtain a polysilicon film 162.

Figure 30:
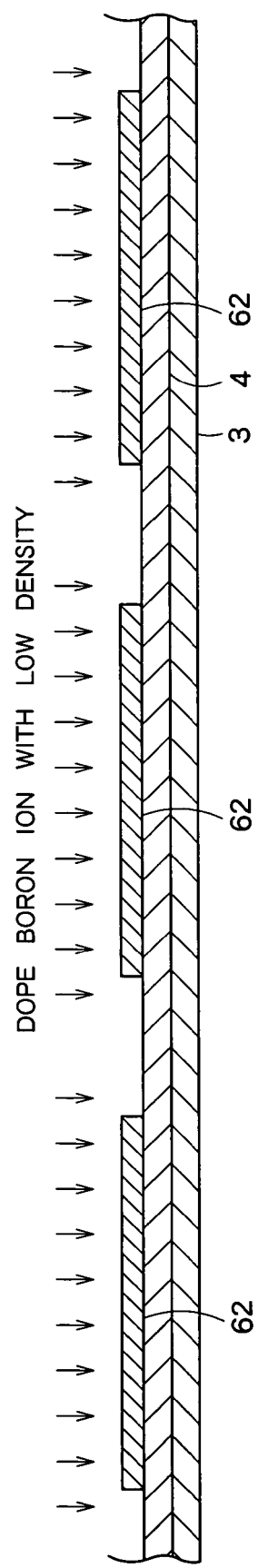
FIG. 30 is a cross section view following to FIG. 29.

Then, the polysilicon film 162 is made into an island-like pattern by dry etching as a dry etching step as shown in FIG. 30.

Thereafter, ion doping of boron (B) with a low density is exerted on the whole surfaces of the patterned polysilicon films 162 with a shape of an island as a first ion doping step, and, assuming the island-like polysilicon film 162 as the p– region, a light receiving section 121 of the light sensor 107, and channel regions 112 of the thin film transistors 105 and 106 are formed.

Figure 31:
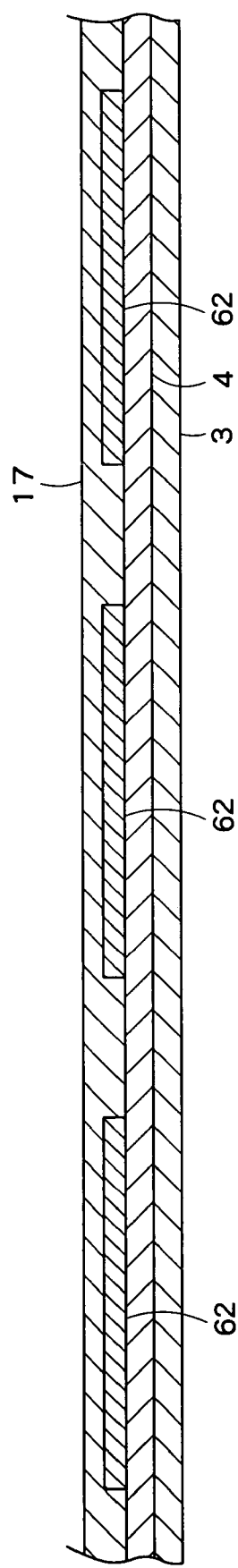
FIG. 31 is a cross section view following to FIG. 30.

Subsequently, the gate insulating film 117 comprising an oxide silicon film (SiOx) is formed on the undercoat layer 104 including the island-like polysilicon films 162 according to the PECVD method, the ECRCVD method, and the like as a step for forming a gate insulating film as shown in FIG. 31.

Figure 32:
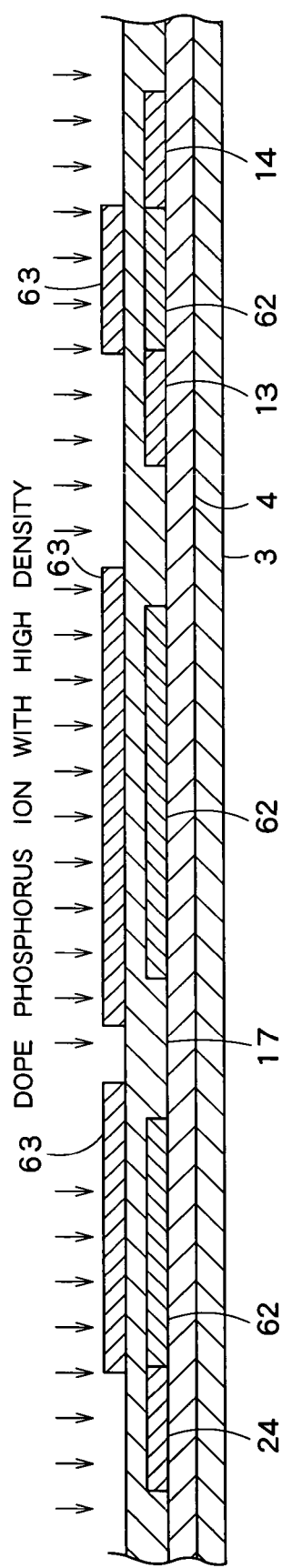
FIG. 32 is a cross section view following to FIG. 31.

Thereafter, resists 163 are formed on the polysilicon films 162 which will become the light receiving section 121 and the p+ region 125 of the light sensor 107, on the polysilicon films 162 which will become the active layer 111 of the p channel type thin film transistor 106, on the polysilicon films 162 which will become the channel region 112 and the LDD regions 115 and 116 of the n channel type thin film transistor 105 as a first step for forming a resist as shown in FIG. 32.

Under the above circumstances, ion doping of the polysilicon films 162 which will become the n+ regions 124 of the light sensor 107, and the polysilicon films 162 which will become the source region 113 and the drain region 114 of the n channel type thin film transistor 105 is performed with high density phosphorus (P) as a second ion doping step, using the resists 163 as a mask, and, then, the n+ regions 124 of the light sensors 107, and the source region 113 and the drain region 114 of the n channel type thin film transistor 105 are formed as the n+ layer.

Figure 33:
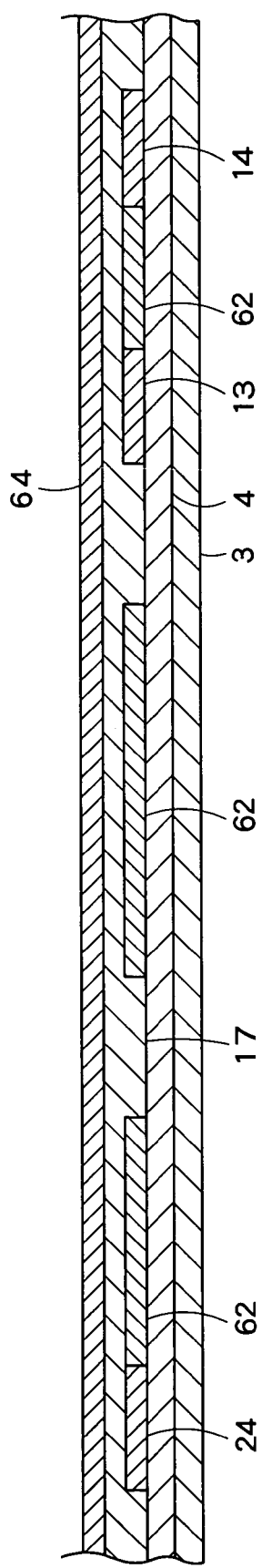
FIG. 33 is a cross section view following to FIG. 32.

Subsequently, after removing the resists 163, a molybdenum-tantalum (Mo—Ta) alloy and a molybdenum-tungsten (Mo—W) alloy are deposited on the gate insulating film 117 as a step for forming the first metal as shown in FIG. 33 to form a first metallic layer 164.

Thereafter, a portion in which the p+ region 125 of the light sensor 107 will be formed, and a portion in which the source region 113 and the drain region 114 of the p channel type thin film transistor 106 will be formed are opened by patterning of the first metallic layer 164 as a first patterning step as shown in FIG. 34.

Under the above circumstances, ion doping of the polysilicon films 162 which will become the p+ region 125 of the light sensor 107, and the polysilicon films 162 which will become the source region 113 and the drain region 114 of the p channel type thin film transistor 106 is performed with high density phosphorus (P) as a third ion doping step, using the patterned first metallic layer 164 as a mask, and, then, the p+ regions 125 of the light sensors 107 is formed as the n+ layer.

At this time, the patterned first metallic layer 164 becomes the gate electrode 118 in the p channel type thin film transistor 106.

Figure 35:
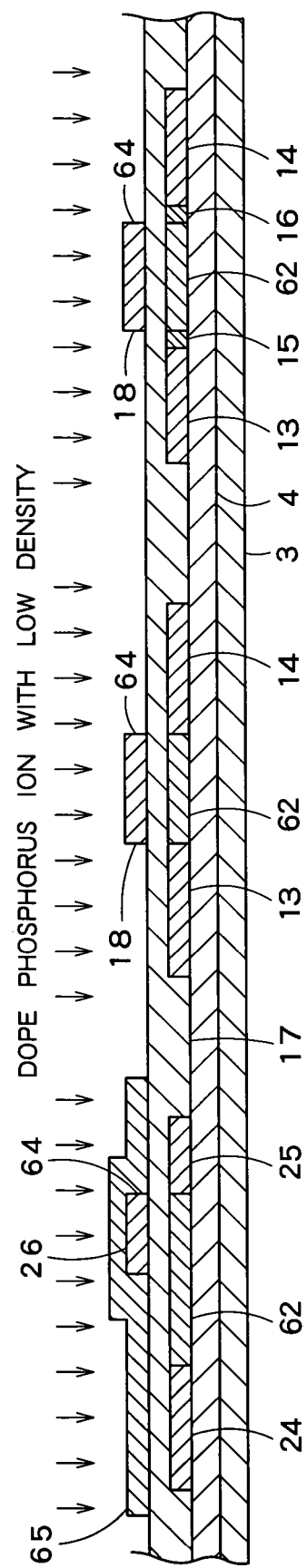
FIG. 35 is a cross section view following to FIG. 34.

Moreover, a portion in which the n+ region 124 and the first light receiving section 122 of the light sensor 107 will be formed, and a portion in which the source region 113, the drain region 114, and the LDD regions 115 and 116 of the n channel type thin film transistor 105 will be formed are opened by further patterning of the first metallic layer 164 as a second patterning step as shown in FIG. 35.

Thereafter, as a second step for forming a resist, a resist mask 165 is formed on the gate insulating film 117 including the first metallic layer 164 which will become the gate electrode 126 of the light sensor 107, and the resist mask 165 covers the polysilicon film 162 which will become the n+ region 124, the light receiving section 121, and the p+ region 125 of the light sensor 107.

Under the above circumstances, ion doping of a portion which will become the source region 113 and the drain region 114 of the p channel type thin film transistor 106, and a portion which will become the source region 113, the drain region 114, and the LDD regions 115 and 116 of the n channel type thin film transistor 105 is performed with low density phosphorus as a fourth ion doping step, using the patterned first metallic layer 164 and the resist mask 165 as a mask, and, then, the source region 113, the drain region 114, and the LDD regions 115 and 116 of the n channel type thin film transistor 105 and the source region 113 and the drain region 114 of the p channel type thin film transistor 106 are formed as the n– layer.

At this time, the patterned first metallic layer 164 becomes the gate electrodes 118 and 126 in the n channel type thin film transistors 105 and 106. Moreover, the light receiving section 121 of the light sensor 107 becomes a region of the p– region into which impurities with a low concentration are injected becomes of a PIN type.

Subsequently, in order to activate impurities which have been doped in the first through fourth ion doping steps, the light receiving section 121, the n+ region 124, and the p+ region 125 of the light sensor 107, the source region 113 and the drain region 114 of the p channel thin film transistor 106, and thin film transistor 105 of n channel type the source region 113, the drain region 114, and the LDD regions 115 and 116 of the n channel thin film transistor 105 are annealed at a temperature of approximately 500 degrees centigrade as a thermal activation step.

Thereafter, the glass substrate 103 comprising the light receiving sections 121, the n+ region 124, and the p+ region 125 of the light sensors 107, and the activation layer 111 of the thin film transistor 105 or 106 are inserted into a not-shown plasma CVD device, and the glass substrate 103 is exposed to the plasma of hydrogen for hydrogenation as a hydrogenation step.

Figure 36:
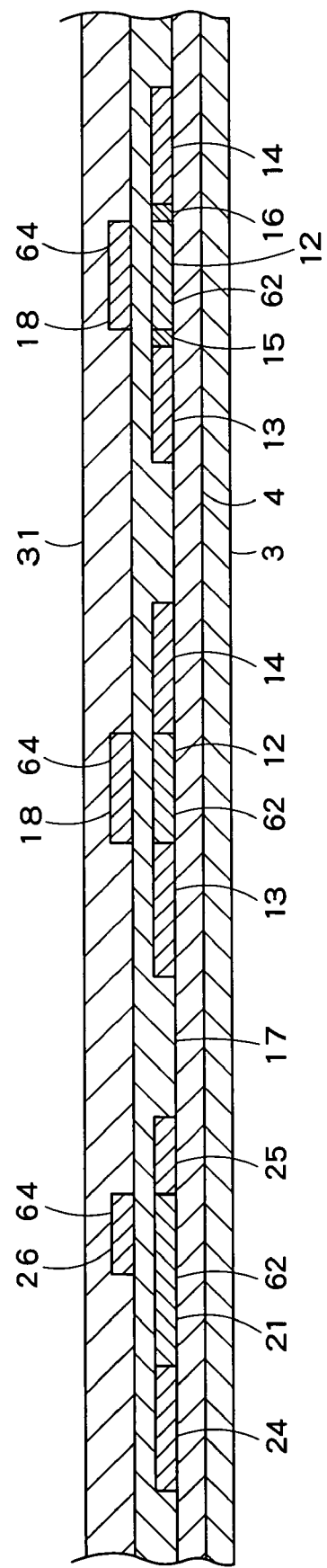
FIG. 36 is a cross section view following to FIG. 35.

Thereafter, in the same plasma CVD device as the plasma CVD device used for hydrogenation, an oxide silicon film, and the like are deposited on the gate insulating film 117 including the gate electrodes 118 and 126 of the light sensor 107 and the thin film transistors 105 and 106 as a step for plasma CVD as shown in FIG. 36 to form the interlayer insulating film 131.

Figure 37:
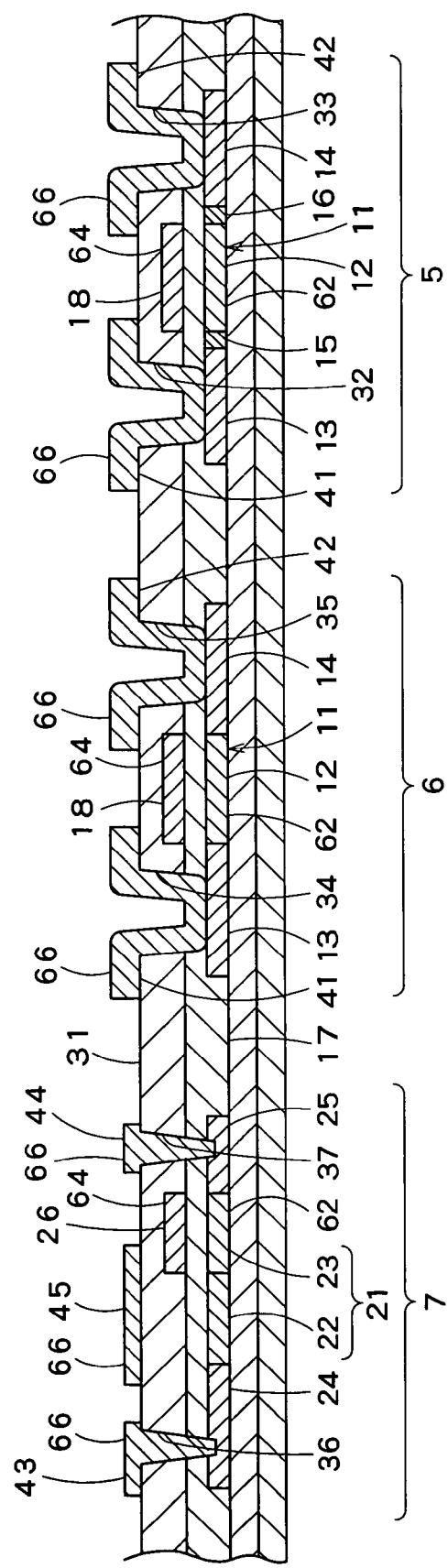
FIG. 37 is a cross section view following to FIG. 36.

Then, as shown in FIG. 37 the contact holes 132, 133, 134, 135, 136, 137 are formed in the interlayer insulating film 131, and the n+ region 124 and the p+ region 125 of the light sensor 107 and the source regions 113 and the drain regions 114 of the p channel type thin film transistor 106 and the n channel thin film transistor 105 are exposed.

Thereafter, a second metallic layer 166 is deposited on the whole surface of the interlayer insulating film 131 including the contact holes 132, 133, 134, 135, 136, and 137 as a step for forming the second metallic layer.

Subsequently, the n type electrode 143, the p type electrode 144, and the light shielding layer 145 of the light sensor 107, the source electrode 141 and the drain electrode 142 of the p channel type thin film transistor 106, and the source electrode 141 and the drain electrode 142 of the n channel type thin film transistor 105 are formed by patterning of the second metallic layer 166.

Then, as a step for forming a passivation film, a passivation film 146 which is a silicon nitride (SiN) film is formed on the interlayer insulating film 131 including the n type electrodes 143, the p type electrodes 144, the light shielding layers 145 of the light sensors 107, the source electrode 141 and the drain electrode 142 of the p channel thin film transistor 106, and the source electrode 141 and the drain electrode 142 of the n channel thin film transistor 105 to complete the thin film transistors 105 and 106, and the light sensor 107.

Thereafter, as shown in FIG. 26, the contact hole 147 is formed in the passivation film 146, and the drain electrode 142 of the n channel type thin film transistor 105 is exposed.

Under the above circumstances, after the pixel electrode 148 is formed on the passivation film 146 including the contact hole 147, the alignment film 149 is formed on the passivation film 146 including the pixel electrode 148 to complete the array substrate 102.

Subsequently, after the side of the alignment film 149 of the array substrate 102 and the side of the alignment film 154 of the opposed substrate 151 are installed, opposing to each other, liquid crystal 155 is injected between the alignment film 149 of the array substrate 102 and the alignment film 154 of the opposed substrate 151 for insertion and sealing, and the liquid crystal display device 101 is completed.

Thereafter, a back light is installed at the other side of the array substrate 102 across the opposed substrate 151 in the liquid crystal display device 101.

Though a depletion layer 168 which generates a photoelectric current in the light sensor 107 is extended from the interface between the light receiving section 121 and the n+ region 124 to the light receiving section 121 and the n+ region 124 as described above, the layer 168 is extended longer to the side of the light receiving section 121 with a low concentration of impurities, and is not extended so much to the side of the n+ region 124 with a high concentration of impurities.

Moreover, when a voltage (Vgp) applied between the p+ region 125 and the gate electrode 126 is 0V, the depletion layer 168 is extended not only to the first light receiving section 122, but also to the intermediate section of the second light receiving section 123 in the direction toward the side of the light receiving section 121 as shown in FIG. 38. In this case, light is shielded with the gate electrode 126 with regard to the side of the light receiving section 121 in the depletion layer 168, and light is shielded with the light shielding layer 145 with regard to the side of the n+ region 124 of the depletion layer 168.

On the other hand, a voltage at the second light receiving section 123 is equivalent (p+ like) to the p type electrode 144 and the depletion layer 168 in the light receiving section 121 is only the first light receiving section 122 as shown in FIG. 39 when a voltage (Vgp) applied between the p+ region 125 and the gate electrode 126 is −5V. Because of this, light is shielded with the light shielding layer 145 with regard to the depletion layer 168 at the side of the light receiving section 121 and the side of the n+ region 124.

As a result, the p+ region 125 is not required to cover with the light shielding layer 145, and the area of the light shielding layer 145 can be reduced by exposing the p+ region 125 without covering the p+ region 125 with the light shielding layer 145. Accordingly, as reduction in the aperture ratio of each pixel due to the light shielding layer 145 can be prevented, a liquid crystal display device 101 in which a high-quality display function and a high-performance reading function are separately included can be manufactured.

Moreover, the manufacturing steps can be simplified by forming the light shielding layer 145 at the same step as those of the n type electrode 143 and the p type electrode 144, while the same material is used to manufacture the layer 145, the n type electrode 143, and the p type electrode 144.

FIG. 40 is a view showing a layout of a first example in which a specific method for forming the light shielding layer 145 is indicated. In FIG. 40, the light shielding layer 145 is formed, using signal lines 171 which are electrically connected to the thin film transistors 105 and 106. In this case, the light sensors 107 are provided under the signal lines 171, opposing to one another.

The light shielding layer 145 in FIG. 40 and the signal line 171 formed in the same layer are formed as one body, and the layer 145 is formed at the same step as those of the n type electrode 143 and the p type electrode 144, using the same material as those of the electrodes. The light shielding layer 145 is formed into a shape of a slender and rectangular plate by enlarging both sides of a part of the signal line 171 in the breadth direction, respectively. Moreover, the light shielding layer 145 is extended along the longitudinal direction of the signal line 171, and is provided in the center of the signal line 171. Intersecting perpendicularly to the signal lines 171, a plurality of supplementary capacity lines 172, a plurality of scanning lines 173, and a plurality of sensor control lines 174 are arranged in parallel with one another, and at positions some distance from one another.

Figure 41:
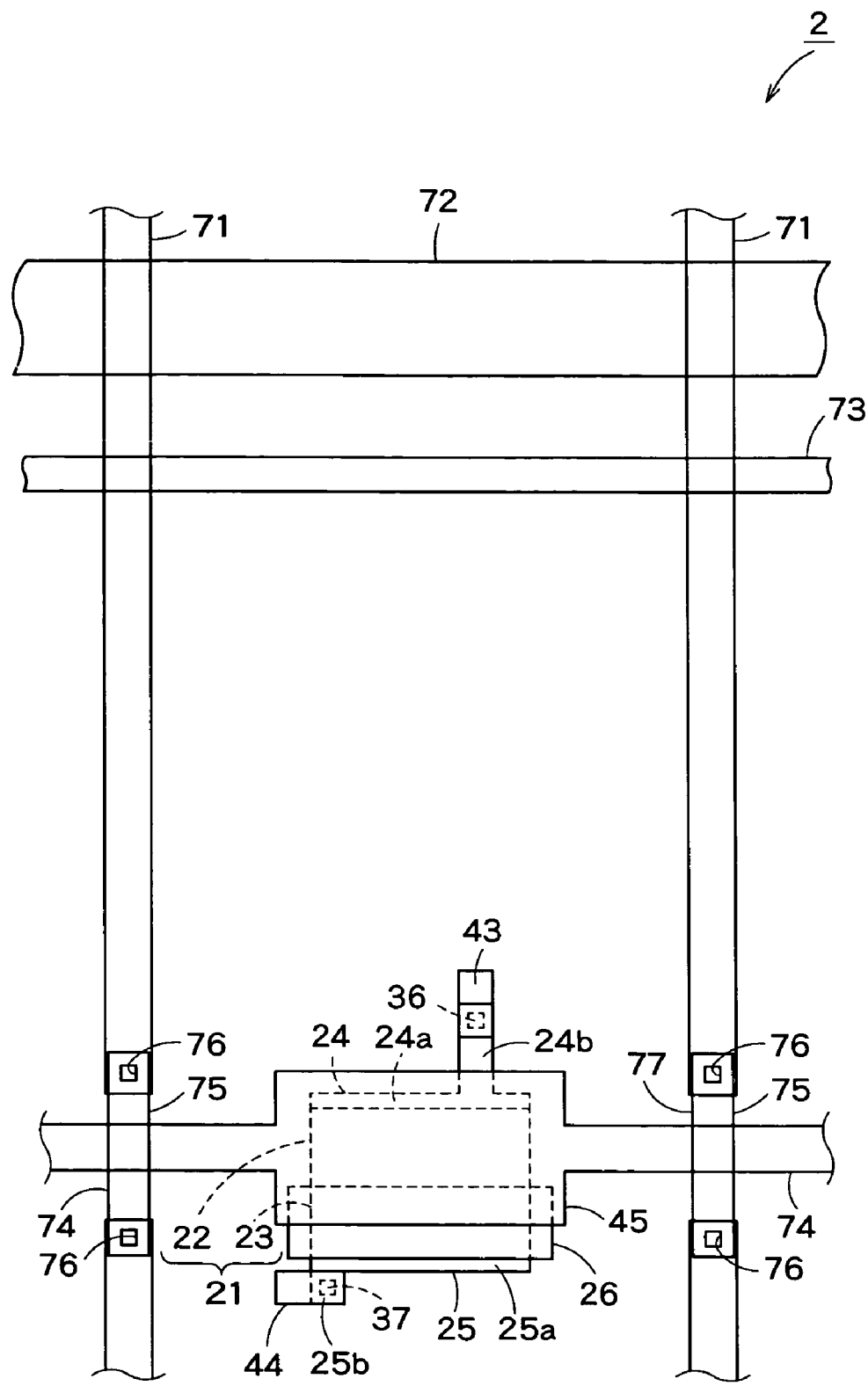
FIG. 41 is a layout diagram showing a second example of a specified forming location of the light shielding layer.

FIG. 41 is a view showing a layout of a second example in which a specific method for forming the light shielding layer 145 is indicated. In FIG. 41, the light shielding layer 145 is formed, using the sensor control lines 174 which supply a voltage to the light sensors 107. In this case, the light sensor 107 is provided under the sensor control line 174, opposing to one another.

The light shielding layers 145 in the light sensors 107 and the sensor control lines 174 are formed as one body, and the layer 145 is formed at the same step as those of the n type electrode 143 and the p type electrode 144, using the same material as those of the electrodes.

The light shielding layer 145 in FIG. 41 is formed into a shape of a slender and rectangular plate by enlarging both sides of a part of the sensor control line 174 in the breadth direction, respectively. Furthermore, the light shielding layer 145 has the longitudinal direction along that of the sensor control line 174, and is provided in the center of the sensor control line 174.

In FIG. 41, a portion in which a signal line 171 intersects with a sensor control line 174 has a divided section 175 which is obtained by dividing the signal line 171 at a predetermined distance in the breadth direction. A contact hole 176 is formed at each end section of each signal line 171 in the longitudinal direction through the divided section 175. The contact hole 176 is opened in an electrically connected state to the end section of a signal line 171. A connecting and wiring section 177, by which signal lines 171 divided at the divided section 175 are electrically connected to one another for conduction, is formed at the contact hole 176. The connecting and wiring section 177 connects the signal lines 171 divided at the divided section 175 along the longitudinal direction. Moreover, the connecting and wiring section 177 is formed in a layer different from that in which the signal line 171 is formed.

Thus, in FIG. 40 and FIG. 41, light shielding layer 145 of light sensor 107 reduction in the aperture ratio of each pixel due to the light shielding layer 145 can be controlled by forming the layer 145 and the signal line 171 or the sensor control line 174 as one body, using the signal line 171 or the sensor control line 174. Accordingly, the display quality and the reading performance can be improved.

When a voltage of 5 V is applied to the n+ region 124 of the light sensor 107 in the liquid crystal display device 101 (Vnp=5V), a photoelectric current at the light receiving section 121 in the light sensor 107 is large, as shown in FIG. 42, for a potential equal to or larger than approximately 2V with regard to the light shielding layer 145 in the light sensor 107. On the other hand, when the potential of the light shielding layer 145 in the light sensor 107 is smaller than approximately 2V, a photoelectric current in the light receiving section 121 of the light sensor 107 is reduced.

At this time, the potential of the n+ region 124 in the light sensor 107 is changed within a range of from 2.5V or more to 5V or less when the light sensor 107 is an actual device. Moreover, if the potential of the light shielding layer 145 in the light sensor 107 is changed within the same range as that of the n+ region 124, the reduction in the light sensitivity of the light sensor 107 can be prevented.

At the same time, requirements for new power supply wiring, which is necessary for a case in which charges given to the light shielding layer 145 in the light sensor 107 is different from those of the other power supplies, can be eliminated by a configuration in which the potential of the light shielding layer 145 in the light sensor 107 is made equal to that of the n+ region 124 in the light sensor 107. Therefore, the reduction in the aperture ratio due to new power supply wiring can be avoided, and the reduction in the aperture ratio of each pixel in the array substrate 102 can be controlled. Accordingly, as reduction in the light sensitivity can be prevented without reduction in the aperture ratio, a liquid crystal display device 101 with a high-performance reading function and a high-quality display function can be realized.

Though an array substrate 102 used for a liquid crystal display device 101 has been explained in the above-described embodiments, even a circuit board used for an electronic luminescence (EL) element can be applied with some adjustment.

In each of the embodiments, the TFTs formed on the array substrate 102 are not limited to so-called top gate type in which the channel, the gate insulation film and the gate electrode are formed on the array substrate in sequence). The present invention is applicable to the TFTs may be bottom gate type in which the gate electrode, the gate insulation film and the channel are formed on the array substrate in sequence).

What is claimed is:

1. A photoelectric conversion device, comprising:
   first, second and third semiconductor regions disposed adjacently in sequence in direction parallel to a surface of an insulation substrate;
   a first insulation layer formed on upper face of said first, second and third semiconductor regions;
   a gate electrode formed on a portion of upper face of said first insulation layer;
   a second insulation layer formed on upper face of said first insulation layer and said gate electrode; and
   an electrode layer connected said first and third semiconductor layers via contacts formed on portions of said first and second insulation layers,
   said first semiconductor regions being formed by injecting a first conductive impurity in first dose amount;
   said third semiconductor regions being formed by injecting a second conductive impurity in second dose amount;
   said second semiconductor region being formed by injecting said second conductive impurity in third dose amount less than said second dose amount; and
   a photodiode formed using the first, second, and third semiconductor regions.

* * * * *